United States Patent
Glazman et al.

(10) Patent No.: US 12,187,297 B2
(45) Date of Patent: Jan. 7, 2025

(54) SYSTEMS AND METHODS FOR ADJUSTMENT OF VEHICLE SUB-SYSTEMS BASED ON MONITORING OF VEHICLE OCCUPANT(S)

(71) Applicant: Gentex Corporation, Zeeland, MI (US)

(72) Inventors: Vladimir Glazman, Ashkelon (IL); Yonatan Eadan, Yavne (IL); Gil Dotan, Tel-Aviv (IL); Yoav Zuta, Tel-Aviv (IL); Erab Dukas, Tel-Aviv (IL); Guy Raz, Binyamina (IL)

(73) Assignee: GENTEX CORPORATION, Zeeland, MI (US)

( * ) Notice: Subject to any disclaimer, the term of this patent is extended or adjusted under 35 U.S.C. 154(b) by 150 days.

(21) Appl. No.: 17/962,699

(22) Filed: Oct. 10, 2022

(65) Prior Publication Data
US 2023/0030426 A1  Feb. 2, 2023

Related U.S. Application Data

(62) Division of application No. 16/769,648, filed as application No. PCT/IL2018/051307 on Nov. 29, 2018, now Pat. No. 11,465,635.
(Continued)

(51) Int. Cl.
*G06K 9/00* (2022.01)
*B60H 1/00* (2006.01)
(Continued)

(52) U.S. Cl.
CPC ..... *B60W 50/0098* (2013.01); *B60H 1/00357* (2013.01); *B60H 1/00742* (2013.01);
(Continued)

(58) Field of Classification Search
CPC .............. G06F 7/00; G06K 9/00; B60R 25/00
(Continued)

(56) References Cited

U.S. PATENT DOCUMENTS 5,754,099 A  5/1998  Nishimura et al.
6,169,478 B1  1/2001  Hada et al.
(Continued)

FOREIGN PATENT DOCUMENTS

EP  1482448 A2  12/2004
WO  2014093100 A1  6/2014
(Continued)

OTHER PUBLICATIONS

Murphy et al. "Head Pose Estimation in Computer Vision: A Survey," IEEE Transactions of Pattern Analysis and Machine Intelligence, 31(4): 607-626; Apr. 25, 2008.
(Continued)

*Primary Examiner* — Seyed H Azarian
(74) *Attorney, Agent, or Firm* — Price Heneveld LLP; Brian James Brewer

(57) ABSTRACT

There is provided a system for generating instructions for adjustment of vehicle sub-system(s) according to an analysis of a computed six degrees of freedom (6 DOF) of vehicle occupant(s), comprising: hardware processor(s), and a non-transitory memory having stored thereon a code for execution by the at least one hardware processor, the code comprising instructions for: obtaining at least one image of a cabin of a vehicle captured by an image sensor, obtaining depth data from a depth sensor that senses the cabin of the vehicle, wherein the at least one image and the depth data depict at least one head of at least one occupant, computing 6 DOF for the at least one head according to the at least one image and depth data, and generating instructions for adjust-
(Continued)

ment of at least one vehicle sub-system according to the computed 6 DOF of the at least one vehicle occupant.

13 Claims, 10 Drawing Sheets

Related U.S. Application Data

(60) Provisional application No. 62/594,043, filed on Dec. 4, 2017.

(51) Int. Cl.
| | | |
|---|---|---|
| *B60R 25/00* | (2013.01) | |
| *B60W 50/00* | (2006.01) | |
| *G06F 7/00* | (2006.01) | |
| *G06T 7/50* | (2017.01) | |
| *G06V 20/59* | (2022.01) | |
| *G06V 40/10* | (2022.01) | |
| *G06V 40/16* | (2022.01) | |
| *H04S 7/00* | (2006.01) | |

(52) U.S. Cl.
CPC .............. *G06T 7/50* (2017.01); *G06V 20/593* (2022.01); *G06V 40/10* (2022.01); *G06V 40/166* (2022.01); *H04S 7/303* (2013.01); *G06T 2207/10028* (2013.01); *G06T 2207/30201* (2013.01); *G06T 2207/30268* (2013.01); *H04R 2499/13* (2013.01)

(58) Field of Classification Search
USPC ....... 382/100, 103, 106–107, 104, 168, 173, 382/181, 199, 219, 254, 276, 286–291, 382/305, 318; 701/45, 36, 115, 110; 348/47; 359/843
See application file for complete search history.

(56) References Cited

U.S. PATENT DOCUMENTS

| | | | |
|---|---|---|---|
| 8,702,250 B2 * | 4/2014 | Raz | B60R 1/07 359/843 |
| 9,800,983 B2 * | 10/2017 | Wacquant | H04R 27/00 |
| 2004/0153229 A1 * | 8/2004 | Gokturk | B60R 21/0152 701/45 |
| 2005/0131607 A1 | 6/2005 | Breed | |
| 2016/0029111 A1 | 1/2016 | Wacquant et al. | |
| 2016/0065940 A1 * | 3/2016 | Loong | H04N 13/207 348/47 |
| 2018/0136653 A1 * | 5/2018 | Tao | B60W 60/0016 |
| 2019/0300041 A1 * | 10/2019 | Kurokawa | B62D 1/184 |
| 2020/0064483 A1 * | 2/2020 | Li | G01S 13/867 |
| 2021/0133871 A1 * | 5/2021 | Konrardy | G08G 1/096783 |
| 2022/0055746 A1 * | 2/2022 | Zhang | G08G 5/0069 |

FOREIGN PATENT DOCUMENTS

| | | |
|---|---|---|
| WO | 2015193056 A1 | 12/2015 |
| WO | 2020111244 A1 | 6/2020 |

OTHER PUBLICATIONS

Fletcher et al. "Driver Inattention Detection based on Eye Gaze-Road Event Correlation," The International Journal of Robotics Research, 289(6): 774-801, Jun. 2009.
Vauxhall "Guiding Light: Eye-Tracking Technology From Opel/Vauxhall," Media United Kingdom, 2 pages, Mar. 15, 2015.
Solomon, Cleshain et al. "Driver Attention and Behavior Detection with Kinect," Journal of Image and Graphics, vol. 3, No. 2, Dec. 2015.
International Search Report and the Written Opinion Dated Mar. 10, 2019 from the International Searching Authority Re. Application No. PCT/IL2018/051307 (36 pages).
International Preliminary Report on Patentability Dated Jun. 18, 2020 from the International Bureau of WIPO Re. Application No. PCT/IL2018/051307 (8 pages).

* cited by examiner

SYSTEMS AND METHODS FOR ADJUSTMENT OF VEHICLE SUB-SYSTEMS BASED ON MONITORING OF VEHICLE OCCUPANT(S)

CROSS-REFERENCE TO RELATED APPLICATIONS

This application is a divisional application of U.S. patent application Ser. No. 16/769,648, filed on Jun. 4, 2020, which is a 371 national stage application of International Patent Application No. PCT/IL2018/051307, filed on Nov. 29, 2018, which claims the benefit of priority under 35 USC § 119(e) of U.S. Provisional Patent Application No. 62/594,043 filed Dec. 4, 2017, the contents of which are incorporated herein by reference in their entirety.

BACKGROUND

The present invention, in some embodiments thereof, relates to vehicle sensors and, more specifically, but not exclusively, to vehicle intra passenger compartment monitoring and applications.

Vehicles employ a range of sensors for sensing the internal passenger compartment and automatically adjusting vehicle sub-systems accordingly. For example, a vehicle air conditioner may be automatically adjusted based on output of a temperature sensor to maintain a preset target air temperature within the cabin.

SUMMARY

According to a first aspect, a system for generating instructions for adjustment of at least one vehicle sub-system according to an analysis of a computed six degrees of freedom (6 DOF) of at least one vehicle occupant, comprises: at least one hardware processor, and a non-transitory memory having stored thereon a code for execution by the at least one hardware processor, the code comprising instructions for: obtaining at least one image of a cabin of a vehicle captured by an image sensor, obtaining depth data from a depth sensor that senses the cabin of the vehicle, wherein the at least one image and the depth data depict at least one head of at least one occupant, computing 6 DOF for the at least one head according to the at least one image and depth data, and generating instructions for adjustment of at least one vehicle sub-system according to the computed 6 DOF of the at least one vehicle occupant.

According to a second aspect, a system for generating instructions for adjustment of at least one vehicle sub-system according to an analysis of parameters of at least one vehicle occupant, comprises: at least one hardware processor, and a non-transitory memory having stored thereon a code for execution by the at least one hardware processor, the code comprising instructions for: obtaining at least one of: (i) at least one image of a cabin of a vehicle captured by an image sensor, and (ii) depth data from a depth sensor that senses the cabin of the vehicle, wherein the at least one image and the depth data depict at least one occupant of the vehicle, inputting at least one of: (i) the at least one image and (ii) the depth data into at least one classifier, computing, by the at least one classifier, an indication of at least one physical parameter of each of the at least one occupant, wherein the at least one classifier is trained according to a training dataset comprising a plurality of at least one of training images and training depth data of each of a plurality of sample individuals, and an associated indication of at least one physical parameter for each of the plurality of sample individuals, and generating instructions for adjustment of at least one vehicle sub-system according to the computed at least one physical parameter of the at least one vehicle occupant.

According to a third aspect, a system for generating instructions for adjustment of at least one vehicle sub-system according to an analysis of a point cloud of at least one vehicle occupant, comprises: at least one hardware processor, and a non-transitory memory having stored thereon a code for execution by the at least one hardware processor, the code comprising instructions for: computing a point cloud based on output of a point cloud sensor, the point cloud senses the cabin of the vehicle and depicts at least one occupant of the vehicle, and generating instructions for adjustment of at least one vehicle sub-system according to the computed point cloud.

At least some of the systems, apparatus, methods, and/or code instructions (stored in a data storage device executable by one or more hardware processors) described herein improve safety provided by components of a vehicle that have traditionally been passive in nature. At least some of the systems, apparatus, methods, and/or code instructions (stored in a data storage device executable by one or more hardware processors) described herein relate to the technical problem of improving safety of passengers in a vehicle, in particular, improving safety provided by passive components. Such passive components are designed to provide safety for the driver and/or passenger of the vehicle during an accident and include, for example, seat belts, air bags, and/or other structural components of the vehicle. Traditionally, passive components are simple and generic. For example, the same seat belt type and/or seat belt configuration is used by all passengers (e.g., regardless of height and/or weight), and/or the tension of the seat belt cannot be adjusted. At least some of the systems, apparatus, methods, and/or code instructions described herein compute physical parameters of the occupants using image(s) and/or depth data, and generate instructions for automatic adjustment of the otherwise traditional passive components according to the physical parameters. At least some of the systems, apparatus, methods, and/or code instructions described herein customize otherwise passive safety components for each occupant, improving the safety provided to the occupant by the component that is adjusted according to the physical parameters of the user.

An aspect of some embodiments of the present invention relates to systems, an apparatus, methods, and/or code instructions (e.g., stored in a data storage device executable by one or more hardware processors) for generating instructions for adjustment of one or more vehicle sub-systems according to an analysis of estimated physical parameters of one or more vehicle occupants. The physical parameters relate to physical properties of the respective vehicle occupants, for example, mass, mass classification category, height, height classification category, age, age classification category, gender, and body pose classification category. Indications of the physical parameters may be computed by at least one classifier that is provided with one or more images of the cabin of the vehicle captured by an image sensor and/or depth data obtained from a depth sensor. The image(s) and/or depth data depict one or more occupants of the vehicle. The classifier is trained according to a training dataset of training images and/or training depth data of multiple sample individuals, and an associated indication of physical parameter(s) of the respective sample individual. Alternatively or additionally, the depth data is fed into a non-machine learning process (e.g., non-deep learning process), for example, a process that receives the depth data as input and computes volume, which may include height and/or other body dimension. An estimate of mass is computed based on the volume, optionally according to the height and/or other body dimensions. Instructions for adjustment of one or more vehicle sub-systems are generated according to the computed physical parameters of vehicle occupant(s), for example, according to a set of rules, mapping to preset stored configurations, and/or trained machine learning code. Exemplary vehicle sub-systems include an airbag sub-system, a seatbelt tension sub-system, emergency maneuver sub-system, and stabilization sub-system.

At least some of the systems, apparatus, methods, and/or code instructions (stored in a data storage device executable by one or more hardware processors) described herein address the technical problem of increasing accuracy of adjustment of vehicle sub-systems for occupants of the vehicle. Other occupant tracking systems, for example that rely only on images, may provide only a limited amount of location data, resulting in relatively less accuracy defining the location of the head of the occupant. In contrast, at least some of the systems, apparatus, methods, and/or code instructions described herein compute a full pose computation and/or a full six degrees of freedom for occupants, optionally for each occupant. It is noted that since humans are not rigid objects, motion may be complex. When the 6 DOF are inadequate for representing the complex motion, the full pose computation may be computed. The six degrees of freedom and/or full pose computation enable relatively higher accuracy in adjustment of the vehicle sub-systems. As used herein, the term 6 DOF may sometimes be substituted with the term full pose computation.

At least some of the systems, apparatus, methods, and/or code instructions (stored in a data storage device executable by one or more hardware processors) described herein improve the process of adjustment of vehicle sub-systems for occupants of the vehicle, in particular, improve the adjustment of safety related vehicle sub-systems for increasing safety of the occupants in the vehicle. Traditional systems generally detect the presence or absence of occupants, and may provide instructions to the driver and/or to the occupants to manually adjust the vehicle sub-system. For example, a sensor that detects the presence of an occupant sitting in a passenger and/or driver seat and that detects that the occupant has not put on a seat belt triggers an indication (e.g., icon, audio message) on the dashboard to remind the occupant to put on the seat belt. Such systems generally rely on human intervention to perform the adjustment of the sub-system. Other systems rely on a standard process and/or protocol regardless of the occupants of the vehicle. For example, seat belts and automatic breaking systems operate in the same way for all occupants. Other traditional systems are completely dependent on human control, for example, when a baby seat is placed in a seat associated with an air bag, the air bag is manually disconnected. When an adult then sits in the seat associated with the air bag, the air bag is manually reactivated. In contrast, at least some of the systems, apparatus, methods, and/or code instructions described herein compute indications of physical parameters of the occupants by a trained classifier that is fed images and/or depth data of the cabin, and generates instructions for adjustment of vehicle sub-systems according to the computed physical parameters of the occupants. The computed physical parameters provide for customized instructions of the adjustment of the vehicle sub-system according to the actual occupants currently in the vehicle. The customized instructions may improve safety of the occupants by adjustment of the vehicle sub-system according to the physical parameters of the occupant. For example, the air bag may be automatically turned off when the physical parameters (e.g., mass, length) indicate that the occupant is a baby. In another example, the seat belt tension is adjusted according to the estimated mass of the occupant. Moreover, the automated process for adjustment of the vehicle sub-systems is objective, repeatable, and less prone to errors, in comparison to a human adjustment of vehicle sub-systems. For example, humans may be unable to accurately determine how to adjust the vehicle sub-systems for each occupant (e.g., which may result in an increased risk rather than reducing risk), may forget to activate/deactivate sub-systems (e.g., forget to turn off the air bag for a baby in a baby seat), and/or may generally be unable to manually perform such adjustments, for example, when adjustments are performed quickly in real time such as adjustment of a safety maneuver to present an accident and/or adjustment of seat-belt tension and/or adjustment of an air bag in the split second before impact.

At least some of the systems, apparatus, methods, and/or code instructions (stored in a data storage device executable by one or more hardware processors) described herein improve the technological field of occupant tracking systems. The improvement may include an improvement in computational efficiency of computational resources that compute the six degrees of freedom for the occupants and/or increased efficiency in use of depth sensors and/or image sensors. The improvement may be obtained at least based on the point cloud sensor described herein that captures depth data of the cabin, optionally the entire cabin, including multiple occupants located at any possible seating combination available in the cabin. The same and/or single point cloud computed from the output of the point cloud sensor may be analyzed to compute the six degrees of freedom for all multiple occupants in the cabin. In contrast to other methods that require a dedicated head tracking system to track each occupant (e.g., each occupant requires their own dedicated head tracking system that tracks only their respective head), at least some of the systems, apparatus, methods, and/or code instructions described herein use the same (e.g., single) point cloud computed from the same (e.g., single point cloud sensor) to compute (e.g., in parallel and/or simultaneously) six degrees of freedom for each of multiple occupants.

At least some of the systems, apparatus, methods, and/or code instructions (stored in a data storage device executable by one or more hardware processors) described herein address the technical problem of simplifying a complex installation of sensors and/or computer sub-systems installed within a vehicle. A large number of sensors and/or computer sub-systems are installed in vehicles, since each sensor and/or computer sub-system is specially designed to perform a limited number of functions, usually a single function. For example, a seat-pressure monitor detects the presence of a passenger at each seat. A seatbelt-tension detector sensor detects whether the seat belt is being used by each passenger. The systems, apparatus, methods, and/or code instructions (stored in a data storage device executable by one or more hardware processors) described herein provide a wide range and/or large number of applications based on a single (or a limited number, for example, 2, 3, 4, or 5) installed point cloud sensor. The single point cloud sensor is technically easier to install. The same single point cloud sensor enables a wide range and/or large number of diverse applications, sparing the need to install individual sensors and associated computational sub-systems to provide each application. The single point cloud sensor enabled applications that are not currently provided, and/or cannot be provided, by currently existing sensors.

At least some of the systems, apparatus, methods, and/or code instructions (stored in a data storage device executable by one or more hardware processors) described herein address the technical problem of improving safety of passengers in a vehicle. Safety is improved based on an analysis of the point cloud described herein to determine the location of passenger(s) within the vehicle compartment, and the weight and/or height of the passengers and/or behavior of the driver and/or passengers. For example, the activation of the airbag(s), seat belt(s), and/or automatic braking are controlled to provide maximum safety with minimal injury risk to the passengers according to the location of the passengers and/or weight and/or height of the passengers. In another example, the point cloud, or a sequence of point clouds, are analyzed to identify malicious behavior of the driver and/or passengers which may lead to an increase risk of an accident. Safety measures may be activated to mitigate risk due to the malicious behavior, for example, a message to stop the malicious behavior, and/or automatic stopping of the vehicle.

At least some of the systems, apparatus, methods, and/or code instructions (stored in a data storage device executable by one or more hardware processors) described herein improve performance of existing computing sub-systems within the vehicle based on output of the point cloud sensor. For example, features executed by existing sub-systems within the vehicle may be automatically controlled based on the instructions generated according to the point cloud(s) outputted by the point cloud sensor. The automatic control of the sub-systems may improve efficiency of existing vehicle sub-systems, for example, adjusting the braking system for optimal braking according to the total weight and/or location of the passengers in the vehicle, which may reduce wear on the brakes and/or result in braking in time to avoid a collision.

At least some of the systems, apparatus, methods, and/or code instructions (stored in a data storage device executable by one or more hardware processors) described herein provide a unique user experience to the driver and/or passengers of the vehicle. For example, the identity of the driver and/or passengers are automatically determined based on an analysis of the point cloud(s). A personal profile may be retrieved based on the identified identity. Alternatively, the height and/or weight and/or posture and/or gesture of the driver and/or passengers are computed based on an analysis of the point cloud. Sub-systems of the vehicle may be adjusted for each passenger and/or the driver according to the corresponding personal profile and/or the height and/or weight and/or posture and/or gesture, for example, the height of the head rest, the angle of the seat, the radio station may be selected, the air temperature may be set by the air conditioner, the state of the window may be set, and/or content presented by an infotainment system installed in the vehicle may be selected accordingly.

At least some of the systems, apparatus, methods, and/or code instructions (stored in a data storage device executable by one or more hardware processors) described herein improve performance of a computing device installed within the vehicle, by enabling the computing device to execute a wide range and/or large number of applications based on the single installed point cloud sensor.

At least some of the systems, apparatus, methods, and/or code instructions (stored in a data storage device executable by one or more hardware processors) described herein provide features that act as an objective measurement that may be remotely and automatically performed, with the objective measurement transmitted to a remote server. The objective measurement cannot be adjusted by a user within the vehicle, for example, by the user trying to falsify data and/or behavior. The objective measurements are automatically performed, preventing human errors and/or without relying on human memory. For example, the presence of a baby in a parked car is automatically detected, potentially saving the life of the baby, rather than relying on the driver remembering the baby and/or goodwill of passengers that notice the baby within the parked car. In another example, violent behavior and/or irrational behavior (e.g., due to seizure, a heart attack) of the driver and/or passenger is detected. The car may be automatically stopped safely in response, avoiding an accident. In yet another example, safe driving habits and/or safe driving posture and/or gesture regularly performed by the driver may be detected and rewarded, for example, by low insurance costs.

In a further implementation form of the first aspect, the 6 DOF are computed for each of a plurality of occupants of the vehicle.

In a further implementation form of the first aspect, the plurality of occupants includes a driver, and at least one passenger sitting in a back seat of the vehicle.

In a further implementation form of the first aspect, the at least one image is analyzed to compute a two-dimensional location of the at least one head and a third dimension of the at least one head is computed according to the depth data, wherein three angular degrees of freedom of the at least one head are computed according to the at least one image and according to the depth data.

In a further implementation form of the first aspect, the 6 DOF is computed for each of a plurality of vehicle occupants according to a same image and a same output of the depth sensor.

In a further implementation form of the first aspect, the image and the depth sensor include a wide field of view (FOV) large enough to capture images and depth data of all seating positions in the cabin of the vehicle.

In a further implementation form of the first aspect, the system further comprises code for translating from a head angle and head position computed relative to a sensor frame of reference to a reference external to the image sensor and the depth sensor.

In a further implementation form of the first aspect, the 6 DOF are iteratively computed, and wherein the instructions for adjustment of the at least one vehicle sub-system are dynamically computed according to the iterations of the computation of the 6 DOF.

In a further implementation form of the first aspect, the system further comprises code for computing an average head position and an average head angle over a plurality of iterations computed over a recent historical time interval, and wherein the instructions for adjustment of the at least one vehicle sub-system are according to the average head position and average head angle.

In a further implementation form of the first aspect, the system further comprises code for predicting a likelihood of an impending 6 DOF according to the iterative computations over a historical time interval, and wherein the instructions are generated according to the predicted impending 6 DOF.

In a further implementation form of the first aspect, the three angular degrees of freedom are computed at least by inputting the image into a trained classifier.

In a further implementation form of the first aspect, the system further comprises code for analyzing the image to detect face of the head, wherein the head location is with reference to a defined location on the face.

In a further implementation form of the first aspect, the depth sensor outputting the depth map comprises a point cloud sensor that outputs a point cloud.

In a further implementation form of the first aspect, the generated instructions comprise instructions for adjusting at least one of direction and intensity of a heat ventilation and air conditioning (HVAC) system for directing airflow outputted by the HVAC towards respective heads of each of the at least one vehicle occupant according to the computed respective 6 DOF.

In a further implementation form of the first aspect, the instructions are for adjustment of direction of each of a plurality of airflow vents located at different positions in the cabin of the vehicle, for directing airflow outputted by the plurality of airflow vents towards respective heads of each of the at least one vehicle occupant.

In a further implementation form of the first aspect, the instructions are for adjustment of intensity of airflow by each of a plurality of airflow vents located at different positions in the cabin of the vehicle is according to respective distance from each of the plurality of airflow vents to respective heads of each of the at least one vehicle occupant.

In a further implementation form of the first aspect, the instructions for adjustment of intensity by a certain airflow vent are according to a distance between a certain head and the certain airflow vent.

In a further implementation form of the first aspect, the generated instructions comprise instructions for adjusting a ratio between amplitudes of a plurality of speakers of an audio system located at different locations in the cabin of the vehicle, and a respective volume of each of the plurality of speakers, according to the 6 DOF of at least one vehicle occupant.

In a further implementation form of the first aspect, the instructions are for adjusting volume of a plurality of speakers for maintaining a sound balance between two ears of the at least one vehicle occupant according to the 6 DOF of at least one vehicle occupant relative to the location of the plurality of speakers.

In a further implementation form of the first aspect, the system further comprises code for accessing a pre-calculated spectral map of sound propagation by a plurality of speakers located in the cabin of the vehicle, for possible 6 DOF of at least one vehicle occupant, and wherein the instructions for adjusting the plurality of speakers are computed according to the spectral map for overcoming internal sound reflection and according to path propagation.

In a further implementation form of the first aspect, the instructions are for adjusting a relative phase between each of a plurality of speakers for generating a localized target destructive interference effect and a localized target constructive interference effect for each of a plurality of vehicle occupants according to the 6 DOF of each vehicle occupant.

In a further implementation form of the first aspect, the instructions for adjustment of the plurality of speakers are independently computed for each frequency produced by each of the plurality of speakers and according to relative distances from each head of each vehicle occupant to each speaker of the plurality of speakers.

In a further implementation form of the first aspect, the instructions are generated for adjusting shades of the vehicle for blocking sun according to the 6 DOF of the at least one vehicle occupant and according to a computed position of the sun.

In a further implementation form of the first aspect, the instructions for adjusting the shades of the vehicle are computed according to a target shadow line located below an eye level of at least one occupant.

In a further implementation form of the first aspect, the instructions are generated for dynamic adjustment of a plurality of headlights of a vehicle according to 6 DOF of a driver.

In a further implementation form of the first aspect, the instructions are for adjustment of a pitch and yaw of each of a plurality of headlights of the vehicle.

In a further implementation form of the first aspect, the system further comprises code for obtaining an indication of a detected obstacle located externally to the vehicle, wherein the instructions are for generating an alert when the 6 DOF of a driver are indicating that the driver is not looking at the obstacle.

In a further implementation form of the first aspect, the alert is not generated when the 6DOF of the driver are indicating that the driver is looking at the obstacle.

In a further implementation form of the first aspect, the system further comprises code for determining that the 6DOF of the head of the driver are indicative that the driver is looking at the obstacle, monitoring to detect a preventive reaction by the driver in response to the obstacle, and generating the alert when a time threshold has passed and the preventive reaction by the driver has not been detected.

In a further implementation form of the first aspect, the instructions are generated for dynamic adjustment of a seat of a respective occupant according to the 6 DOF of the respective vehicle occupant.

In a further implementation form of the first aspect, the seat is dynamically adjusted according to a set of rules that maps between 6 DOF and seat position. The rules selected for providing optimal position of a head of a driver for best view of a road ahead and surroundings while maintaining comfort.

In a further implementation form of the first aspect, the adjustment of the seat is selected from the group consisting of: seat height, seat forward-backward position, seat back tilt angle, and headrest height.

In a further implementation form of the second aspect, the at least one physical parameter of a respective occupant is an estimate of at least one member selected from the group consisting of: mass, mass classification category, height, height classification category, age, age classification category, gender, and body pose classification category.

In a further implementation form of the second aspect, the classifier comprises a deep neural network.

In a further implementation form of the second aspect, the classifier includes code for at least one of: (i) analyzing the depth data to estimate volume and dimensions including height of at least one occupant, computing body structure of at least one occupant according to the computed estimate of volume and dimensions, and computing mass of each at least one occupant according to the computed body structure, (ii) computing age and/or gender according to the computed body structure, and (iii) identifying relative locations of at least one body part according to the depth data and computing a body post classification category according to the identified relative locations of at least one body part.

In a further implementation form of the second aspect, the generated instructions comprises instructions for adjusting parameters of an airbag vehicle sub-system for each respective occupant.

In a further implementation form of the second aspect, the parameters selected from the group consisting of: airbag pressure set to support height and/or mass of the respective occupant, activation trigger set according to body pose of the respective occupant, relative pressure and relative activating sequence for each of a plurality of airbags of a single occupant, disabling of at least one airbag for an age indicative of small children and/or indication of body pose likely to incur damage from deployment, and direction of airbag during deployment for likelihood of increasing protection of the body of the respective occupant.

In a further implementation form of the second aspect, the generated instructions comprises instructions for adjusting tension of a seatbelt sub-system of each respective occupant according to height and/or mass of the respective occupant, the tension selected to provide sufficient force to hold the respective occupant in place while reducing risk of injury due to over-tension.

In a further implementation form of the second aspect, the generated instructions comprises instructions for controlling the vehicle emergency maneuver sub-system for performing an emergency maneuver for minimizing damage to each occupant.

In a further implementation form of the second aspect, the emergency maneuver is selected from the group consisting of: a turn to reduce or avoid impact wherein the turn is computed according to mass and/or body pose of at least one occupant, reducing severity of impact on seats occupied by children, and maneuvering the vehicle for impact at unoccupied locations.

In a further implementation form of the second aspect, the generated instructions comprise instructions for adjustment of a vehicle stabilization sub-system according to a center of mass of the vehicle computed according to an aggregation of mass and location of each occupant.

In a further implementation form of the third aspect, a single point cloud outputted by a single point cloud sensor depicts all occupants of the vehicle.

In a further implementation form of the third aspect, the point cloud sensor comprises:
  (i) a light source configured of generating a single light beam,
  (ii) a first optical device configured for converting the single light beam into a structured pattern and for distorting the structured pattern into a distorted pattern having a wider angle of view than the structured pattern,
  (iii) a second optical device configured for capturing the distorted pattern from a surface in an environment and converting the distorted pattern into a non-distorted pattern identical or similar to the structured pattern, and
  (iv) an imaging sensor configured for mapping the captured non-distorted pattern,
wherein the captured non-distorted pattern mapped to the imaging sensor is processed by the at least one hardware for computing the point cloud.

In a further implementation form of the third aspect, the system further comprises code for analyzing the point cloud to compute an indication of identity of the at least one occupant, accessing a user profile of each identified at least one occupant, and wherein the instructions are generated for adjustment according to customized vehicle parameters stored in the user profile.

In a further implementation form of the third aspect, the user profile stores an indication of a prohibition of driving the vehicle, and wherein the instructions are generated for preventing driving of the car by the identified at least one occupant.

In a further implementation form of the third aspect, the system further comprises code for analyzing the point cloud relative to a set of rules indicative of prohibited user profiles, creating an indication of invalidity when the set of rules are determined to be violated based on the analysis, wherein the instructions are generated for preventing driving of the car in response to the determined violation.

In a further implementation form of the third aspect, the prohibited user profiles are selected from the group consisting of: prohibited seating arrangement of the occupants wherein the point cloud data is analyzed to identify a current seating arrangement of the occupants, prohibited postures of occupants during driving of the vehicle wherein the point cloud data is analyzed to identify a current posture of each of the occupants, prohibited number of occupants in the vehicle wherein the point cloud data is analyzed to compute a total number of occupants in the vehicle, and prohibition of a child along in the vehicle when the vehicle is parked wherein the point cloud data is analyzed to identify a child alone in the vehicle.

In a further implementation form of the third aspect, the system further comprises code for analyzing the point cloud to compute posture and/or gesture and/or behavior of the at least one occupant, computing an indication of malicious behavior by a trained classifier provided with an input of an indication of the posture and/or gesture and/or behavior of the at least one occupant, and wherein the instructions are generated according to the indication of malicious behavior.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
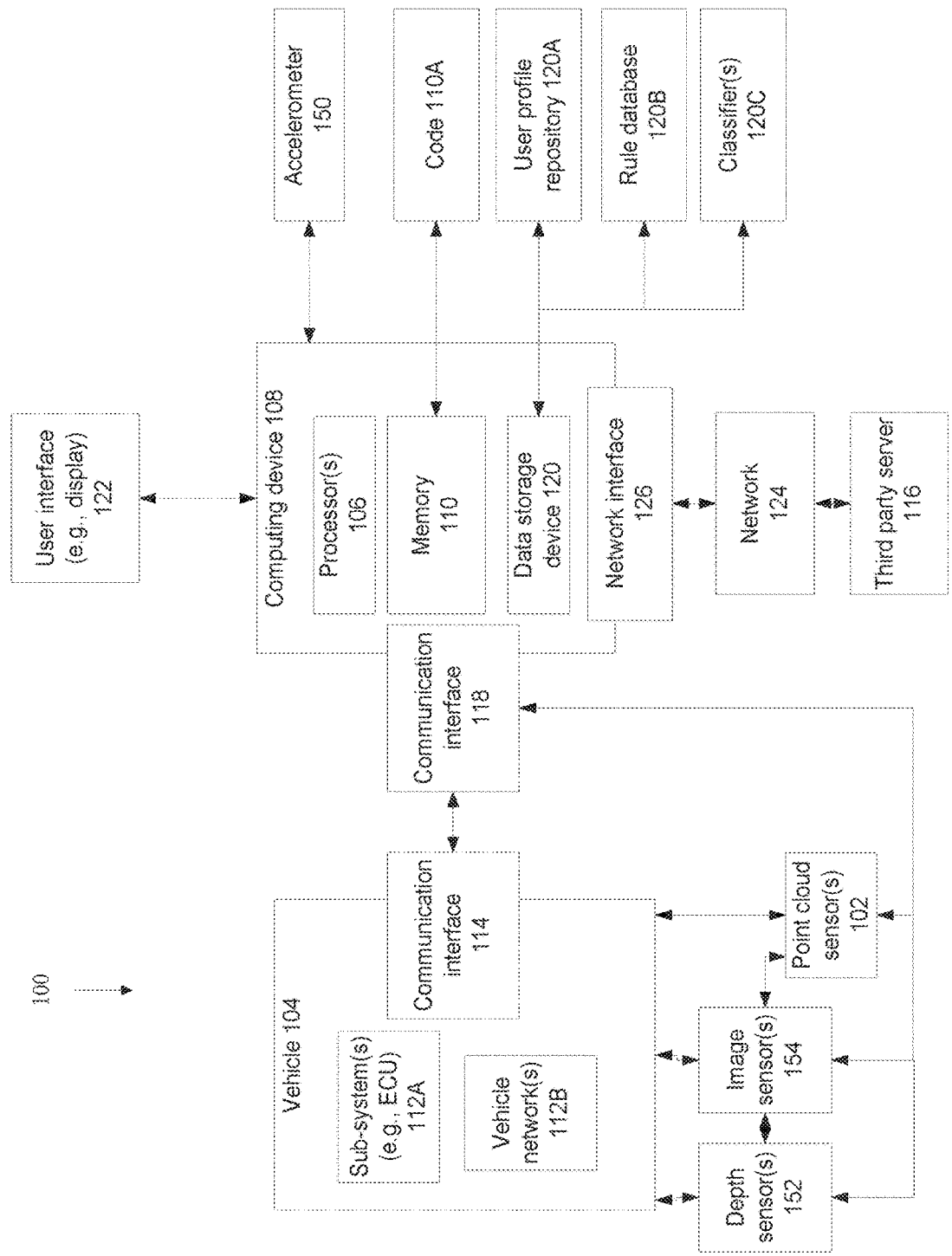
FIG. 1 is a block diagram of a system for generation of instructions for execution of application(s) by vehicle sub-systems (e.g., ECUs, electrical and/or mechanical components) based on monitoring of vehicle intra passenger compartment by one or more sensors, in accordance with some embodiments of the present invention.

The present invention, in some embodiments thereof, relates to vehicle sensors and, more specifically, but not exclusively, to vehicle intra passenger compartment monitoring and applications.

As used herein, the term vehicle means a road based vehicle, for example, a car, a truck, a van, a minivan, a bus, a pick-up truck, a fire truck, an ambulance, a taxi, and a snow removal truck. The vehicle may be an autonomously driven vehicle, a manually driven vehicle, or a semi-autonomous semi-manual driven vehicle.

As used herein, the term intra passenger compartment, and the term cabin may be interchanged. The term vehicle may sometimes refer to the cabin of the vehicle.

As used herein, the term occupant refers to the driver and/or passengers, which may be sitting at any of the designated seats in the cabin of the vehicle.

As used herein, the term six degrees of freedom (6 DOF) refers to a three dimensional (3D) coordinate system within a 3D space defining location of an object (e.g., x,y,z coordinates) and orientation of the object (e.g., pitch, roll, yaw). The term position refers to the 3D location within the 3D space optionally based on x,y,z coordinates. The term angles refers to the orientation of the object within the 3D space, optionally according to 3 DOF such as pitch, roll, and yaw.

As used herein, the term 6 DOF refers to the 6 DOF of the head of the respective occupant, and/or to parts of the head of the respective occupant, for example, the eye(s), nose, ear(s), mouth, occupant.

An aspect of some embodiments of the present invention relates to systems, an apparatus, methods, and/or code instructions (e.g., stored in a data storage device executable by one or more hardware processors) for generating instructions for adjustment of one or more vehicle sub-systems according to an analysis of a computed 6 DOF of one or more vehicle occupants. One or more images of a cabin of a vehicle are captured by an image sensor, and depth data of the cabin of the vehicle is outputted by a depth sensor. The image(s) and the depth data depict the respective heads of one or more occupants of the vehicle, optionally all occupants of the vehicle. 6 DOF are computed for the heads, optionally for each head, according to the image(s) and the depth data. Instructions for adjustment of one or more vehicle sub-systems are generated according to the computed 6 DOF of the occupant(s). It is noted that the instructions may be for execution by the sub-systems for adjustment of components (e.g., including mechanical and/or electrical components) and/or ECUs controlled by respective sub-systems. Exemplary sub-systems are for adjustment of one or more of: heating ventilation and air conditioning, audio system, shades, headlight orientation, generation of warning alerts, and seat.

Optionally, the depth sensor is implemented as the point cloud sensor described herein. The depth data is implemented as the point cloud outputted by the point cloud sensor.

Optionally, the analysis is performed for all current occupants of the vehicle. Optionally, a common and/or single image captures all current multiple occupants in the cabin. The same image is analyzed to detect the 2D location of each of the multiple occupants in the vehicle. Optionally, the same set of depth data obtained for the cabin, that includes depth data for each of the multiple occupants of the vehicle, is analyzed to obtain the depth and/or three angular degrees of freedom and/or 2D location for each of the multiple occupants of the vehicle. 6 DOF may be computed for each head of each occupant. Optionally, instructions for adaptation of the vehicle sub-system(s) are generated according to the computed 6 DOF of multiple occupant(s). Instructions may be independently generated for each occupant (e.g., adjust vent located closest to each occupant) and/or may be generated by consideration of all (or subset of) occupants, for example, adjusting audio speaker to create a desired sound pattern in the cabin according to the occupants in the cabin.

An aspect of some embodiments of the present invention relates to systems, an apparatus, methods, and/or code instructions (e.g., stored in a data storage device executable by one or more hardware processors) for creating instructions for adjusting one or more sub-systems (e.g., electronic control units (ECUs)) of a vehicle to obtain a desired feature based on an analysis of a point cloud computed and/or captured by a point cloud sensor within a cabin of a vehicle. An analysis of the point cloud is indicative of the presence and/or movement of the driver and/or passenger within the vehicle. The instructions are transmitted over a vehicle network (e.g., Controller area network (CAN-bus network)) to the ECUs.

At least some of the systems, apparatus, methods, and/or code instructions (stored in a data storage device executable by one or more hardware processors) described herein improve safety provided by components of a vehicle that have traditionally been passive in nature. At least some of the systems, apparatus, methods, and/or code instructions (stored in a data storage device executable by one or more hardware processors) described herein relate to the technical problem of improving safety of passengers in a vehicle, in particular, improving safety provided by passive components. Such passive components are designed to provide safety for the driver and/or passenger of the vehicle during an accident. For example, seat belts, air bags, and/or other structural components of the vehicle. Traditionally, passive components are simple and generic. For example, the same seat belt type and/or seat belt configuration is used by all passengers (e.g., regardless of height and/or weight), and/or the tension of the seat belt cannot be adjusted. At least some of the systems, apparatus, methods, and/or code instructions described herein compute physical parameters of the occupants using image(s) and/or depth data, and generate instructions for automatic adjustment of the otherwise traditional passive components according to the physical parameters. At least some of the systems, apparatus, methods, and/or code instructions described herein customize otherwise passive safety components for each occupant, improving the safety provided to the occupant by the component that is adjusted according to the physical parameters of the user.

An aspect of some embodiments of the present invention relates to systems, an apparatus, methods, and/or code instructions (e.g., stored in a data storage device executable by one or more hardware processors) for generating instructions for adjustment of one or more vehicle sub-system according to an analysis of estimated physical parameters of one or more vehicle occupants. The physical parameters relate to physical properties of the respective vehicle occupants, for example, mass, mass classification category, height, height classification category, age, age classification category, gender, and body pose classification category. Indications of the physical parameters may be computed by at least one classifier that is provided with one or more images of the cabin of the vehicle captured by an image sensor and/or depth data obtained from a depth sensor. The image(s) and/or depth data depict one or more occupants of the vehicle. The classifier is trained according to a training dataset of training images and/or training depth data of multiple sample individuals, and an associated indication of physical parameter(s) of the respective sample individual. Alternatively or additionally, the depth data is fed into a non-machine learning process (e.g., non-deep learning process), for example, a process that receives the depth data as input and computes volume, which may include height and/or other body dimension. An estimate of mass is computed based on the volume, optionally according to the height and/or other body dimensions. Instructions for adjustment of one or more vehicle sub-systems are generated according to the computed physical parameters of vehicle occupant(s), for example, according to a set of rules, mapping to preset stored configurations, and/or trained machine learning code. Exemplary vehicle sub-systems include an airbag sub-system, a seatbelt tension sub-system, emergency maneuver sub-system, and stabilization sub-system.

At least some of the systems, apparatus, methods, and/or code instructions (stored in a data storage device executable by one or more hardware processors) described herein address the technical problem of increasing accuracy of adjustment of vehicle sub-systems for occupants of the vehicle. Other occupant tracking systems, for example that rely only on images, may provide only a limited amount of location data, resulting in relatively less accuracy defining the location of the head of the occupant. In contrast, at least some of the systems, apparatus, methods, and/or code instructions described herein compute a full pose computation and/or a full six degrees of freedom for occupants, optionally for each occupant. It is noted that since humans are not rigid objects, motion may be complex. When the 6 DOF are inadequate for representing the complex motion, the full pose computation may be computed. The six degrees of freedom and/or full pose computation enable relatively higher accuracy in adjustment of the vehicle sub-systems. As used herein, the term 6 DOF may sometimes be substituted with the term full pose computation.

At least some of the systems, apparatus, methods, and/or code instructions (stored in a data storage device executable by one or more hardware processors) described herein improve the process of adjustment of vehicle sub-systems for occupants of the vehicle, in particular, improve the adjustment of safety related vehicle sub-systems for increasing safety of the occupants in the vehicle. Traditional systems generally detect the presence or absence of occupants, and may provide instructions to the driver and/or to the occupants to manually adjust the vehicle sub-system. For example, a sensor that detects the presence of an occupant sitting in a passenger and/or driver seat and that detects that the occupant has not put on a seat belt triggers an indication (e.g., icon, audio message) on the dashboard to remind the occupant to put on the seat belt. Such systems generally rely on human intervention to perform the adjustment of the sub-system. Other systems rely on a standard process and/or protocol regardless of the occupants of the vehicle. For example, seat belts and automatic breaking systems operate in the same way for all occupants. Other traditional systems are completely dependent on human control, for example, when a baby seat is placed in a seat associated with an air bag, the air bag is manually disconnected. When an adult then sits in the seat associated with the air bag, the air bag is manually reactivated. In contrast, at least some of the systems, apparatus, methods, and/or code instructions described herein compute indications of physical parameters of the occupants by a trained classifier that is fed images and/or depth data of the cabin, and generates instructions for adjustment of vehicle sub-systems according to the computed physical parameters of the occupants. The computed physical parameters provide for customized instructions of the adjustment of the vehicle sub-system according to the actual occupants currently in the vehicle. The customized instructions may improve safety of the occupants by adjustment of the vehicle sub-system according to the physical parameters of the occupant. For example, the air bag may be automatically turned off when the physical parameters (e.g., mass, length) indicate that the occupant is a baby. In another example, the seat belt tension is adjusted according to the estimated mass of the occupant. Moreover, the automated process for adjustment of the vehicle sub-systems is objective, repeatable, and less prone to errors, in comparison to a human adjustment of vehicle sub-systems. For example, humans may be unable to accurately determine how to adjust the vehicle sub-systems for each occupant (e.g., which may result in an increased risk rather than reducing risk), may forget to activate/deactivate sub-systems (e.g., forget to turn off the air bag for a baby in a baby seat), and/or may generally be unable to manually perform such adjustments, for example, when adjustments are performed quickly in real time such as adjustment of a safety maneuver to prevent an accident and/or adjustment of seat-belt tension and/or adjustment of an air bag in the split second before impact.

At least some of the systems, apparatus, methods, and/or code instructions (stored in a data storage device executable by one or more hardware processors) described herein improve the technological field of occupant tracking systems. The improvement may include an improvement in computational efficiency of computational resources that compute the six degrees of freedom for the occupants and/or increased efficiency in use of depth sensors and/or image sensors. The improvement may be obtained at least based on the point cloud sensor described herein that captures depth data of the cabin, optionally the entire cabin, including multiple occupants located at any possible seating combination available in the cabin. The same and/or single point cloud computed from the output of the point cloud sensor may be analyzed to compute the six degree of freedom for all multiple occupants in the cabin. In contrast to other methods that require a dedicated head tracking system to track each occupant (e.g., each occupant requires their own dedicated head tracking system that tracks only their respective head), at least some of the systems, apparatus, methods, and/or code instructions described herein use the same (e.g., single) point cloud computed from the same (e.g., single point cloud sensor) to compute (e.g., in parallel and/or simultaneously) six degrees of freedom for each of the multiple occupants.

At least some of the systems, apparatus, methods, and/or code instructions (stored in a data storage device executable by one or more hardware processors) described herein address the technical problem of simplifying a complex installation of sensors and/or computer sub-systems installed within a vehicle. A large number of sensors and/or computer sub-systems are installed in vehicles, since each sensor and/or computer sub-system is specially designed to perform a limited number of functions, usually a single function. For example, a seat-pressure monitor detects the presence of a passenger at each seat. A seatbelt-tension detector sensor detects whether the seat belt is being used by each passenger. The systems, apparatus, methods, and/or code instructions (stored in a data storage device executable by one or more hardware processors) described herein provide a wide range and/or large number of applications based on a single (or a limited number, for example, 2, 3, 4, or 5) installed point cloud sensor. The single point cloud sensor is technically easier to install. The same single point cloud sensor enables a wide range and/or large number of diverse applications, sparing the need to install individual sensors and associated computational sub-systems to provide each application. The single point cloud sensor enabled applications that are not currently provided and/or cannot be provided by currently existing sensors.

At least some of the systems, apparatus, methods, and/or code instructions (stored in a data storage device executable by one or more hardware processors) described herein address the technical problem of improving safety of passengers in a vehicle. Safety is improved based on an analysis of the point cloud described herein to determine the location of passenger(s) within the vehicle compartment, and the weight and/or height of the passengers and/or behavior of the driver and/or passengers. For example, the activation of the airbag(s), seat belt(s), and/or automatic braking, are controlled to provide maximum safety with minimal injury risk to the passengers according to the location of the passengers and/or weight and/or height of the passengers. In another example, the point cloud, or a sequence of point clouds, are analyzed to identify malicious behavior of the driver and/or passengers which may lead to an increase risk of an accident. Safety measures may be activated to mitigate risk due to the malicious behavior, for example, a message to stop the malicious behavior, and/or automatic stopping of the vehicle.

At least some of the systems, apparatus, methods, and/or code instructions (stored in a data storage device executable by one or more hardware processors) as described herein, improve performance of existing computing sub-systems within the vehicle based on output of the point cloud sensor. For example, features executed by existing sub-systems within the vehicle may be automatically controlled based on the instructions generated according to the point cloud(s) outputted by the point cloud sensor. The automatic control of the sub-systems may improve efficiency of existing vehicle sub-systems, for example, adjusting the braking system for optimal braking according to the total weight and/or location of the passengers in the vehicle, which may reduce wear on the brakes and/or result in braking in time to avoid a collision.

At least some of the systems, apparatus, methods, and/or code instructions (stored in a data storage device executable by one or more hardware processors) described herein provide a unique user experience to the driver and/or passengers of the vehicle. For example, the identity of the driver and/or passengers are automatically determined based on an analysis of the point cloud(s). A personal profile may be retrieved based on the identified identity. Alternatively, the height and/or weight and/or posture and/or gesture of the driver and/or passengers are computed based on an analysis of the point cloud. Sub-systems of the vehicle may be adjusted for each passenger and/or the driver according to the corresponding personal profile and/or the height and/or weight and/or posture and/or gesture, for example, the height of the head rest, the angle of the seat, the radio station may be selected, the air temperature may be set by the air conditioner, the state of the window may be set, and/or content presented by an infotainment system installed in the vehicle may be selected accordingly.

At least some of the systems, apparatus, methods, and/or code instructions (stored in a data storage device executable by one or more hardware processors) described herein improve performance of a computing device installed within the vehicle, by enabling the computing device to execute a wide range and/or large number of applications based on the single installed point cloud sensor.

At least some of the systems, apparatus, methods, and/or code instructions (stored in a data storage device executable by one or more hardware processors) described herein provide features that act as an objective measurement that may be remotely and automatically performed, with the objective measurement transmitted to a remote server. The objective measurement cannot be adjusted by a user within the vehicle, for example, by the user trying to falsify data and/or behavior. The objective measurements are automatically performed, preventing human errors and/or without relying on human memory. For example, the presence of a baby in a parked car is automatically detected, potentially saving the life of the baby, rather than relying on the driver remembering the baby and/or goodwill of passengers that notice the baby within the parked car. In another example, violent behavior and/or irrational behavior (e.g., due to seizure, a heart attack) of the driver and/or passenger is detected. The car may be automatically stopped safely in response, avoiding an accident. In yet another example, safe driving habits and/or safe driving posture and/or gesture regularly performed by the driver may be detected and rewarded, for example, by low insurance costs.

At least some of the systems, apparatus, methods, and/or code instructions (stored in a data storage device executable by one or more hardware processors) described herein are tied to physical real-life components, including a physical point cloud sensor(s) that performs measurements on one or more parameters of the intra passenger compartment of the vehicle, a vehicle within which the point cloud sensor(s) is installed, and a hardware data storage device that stores code instructions executable by one or more hardware processor(s).

At least some of the systems and/or methods described herein provide a unique, particular, and advanced technique of controlling vehicle sub-systems.

Accordingly, at least some of the systems and/or methods described herein are inextricably tied to computer technology, to overcome an actual technical problem arising in control of vehicle sub-systems.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a block diagram of a system 100 for generation of instructions for execution of application(s) by vehicle sub-systems (e.g., ECUs, electrical and/or mechanical components) 112A based on monitoring of vehicle intra passenger compartment by sensor(s) including one or more of: a point cloud sensor(s) 102, an image sensor(s) 154, and/or a depth sensor(s) 152, in accordance with some embodiments of the present invention. System 100 may implement one or more features described with reference to FIGS. 3-10. The point cloud outputted by point cloud sensor(s) 102 is processed by one or more hardware processors(s) 106 of a computing device 108 executing code instructions 120A stored in a data storage device 110, also referred to herein as memory 110.

Optionally, a single point cloud sensor 102 is installed within vehicle 104. The single sensor 102 monitors the driver and the passengers within the cabin of vehicle 104. The same single sensor may simultaneously monitor all occupants of the cabin.

Point cloud sensor 102 may be implemented as a system of multiple components, and/or an enclosed apparatus. The components may be packaged in a single housing to provide a system mountable in a confined environment such as a vehicle cabin. Point cloud sensor 102 includes one or more the following components, optionally all of the following components:
  (i) light (visible or invisible) source capable of generating a single, optionally collimated beam;
  (ii) a first optical device for converting the light beam into a structured pattern and for distorting the structured pattern into a distorted pattern having a wider angle of view than the structured pattern;
  (iii) a second optical device for capturing the projected distorted pattern from a surface in the environment and converting the distorted pattern into a non-distorted pattern, wherein the non-distorted pattern can be identical or similar (e.g., same shape but a different size or different spacing of pattern elements) to the structured pattern; and
  (iv) image sensor for mapping the captured non-distorted pattern.

The pattern mapped to the imaging sensor is processed by processor(s) 106 to compute pattern(s) relating to distortion/shift (due to depth) in order to provide depth, contour and/or movement information relating to objects (e.g., vehicle occupants) positioned in the vehicle cabin.

The pattern indicative of depth, contour, and/or movement is referred to herein as point cloud.

As used herein, the term point cloud may refer to a single point cloud, or a sequence of point clouds captured over a time interval, for example, a video of point clouds.

Data outputted by point cloud sensor 102 may be processed by code instructions that when executed by processor(s) 106 qualify and/or quantify surface vibrations (e.g. microvibrations, heartbeat). Surface vibrations of a remote object may be measured using Laser Doppler Vibrometers (LDV) and/or devices for measuring speckle patterns generated on a surface. Speckles are characterized by an intensity pattern produced by interference from a wave front that is scattered from a rough surface. Speckles imaging provides detailed images of the speckles that allows tracking their variation over time to extract surface motion such as rotation, translation and deformation.

The vehicle 104 seats may be impregnated with infrared (IR) dye to contrast the point cloud acquired by sensor 102, as described herein. The IR dye may help support the detection of objects by the point cloud, for example, passengers sitting on the seat, and/or inanimate objects (e.g., belts, bags, boxes). Alternatively or additionally, the seats may include a patterned textile designed to contrast the point cloud acquired by sensor 102, for example, a checked pattern, polka dots, squares, or other patterns according to the generated structure light which is analyzed to compute the point cloud. Alternatively, no IR dye and/or patterned textile is applied to the seats, with the point cloud analysis performed as described herein.

Optionally, one or more image sensor(s) 154 are installed within the cabin of the vehicle. Image sensor(s) 154 output images, which may be still images and/or a video of a sequence of images. Images are optionally two dimensional. Image sensor(s) 154 may be associated with optical elements, for example, a fish eye lens to obtain a single image that includes the whole cabin (i.e., to capture images of all heads of all occupants sitting anywhere in the vehicle cabin).

Optionally, one or more depth sensor(s) 152 are installed within the cabin of the vehicle. Depth sensor(s) 152 output depth data of objects within the cabin of the vehicle. Depth sensor(s) 152 may be implemented as point cloud sensor(s) 102, in which case the depth data is the point cloud outputted by point cloud sensor(s) 102.

Computing device 108 may be installed within vehicle 104, for example, as a hardware component installed in the car, and/or as software installed on an existing computing device and/or computing component located within vehicle 104. Computing device 108 may be installed as a sub-system (e.g., ECU) within vehicle 104 and/or in association with a system and/or an ECU, connected to one or more vehicle networks 112B, for example, CAN-bus network. Computing device 108 may transmit messages over the vehicle network to other sub-systems with instructions, for example, to query data, and/or instruct other sub-systems to perform functions, as described herein.

Alternatively or additionally, computing device 108 is implemented as an external component and/or a portable computing device that may be used for other purposes, for example, a mobile device (e.g., Smartphone, table computer, laptop computer, glasses computer, and watch computer) executing locally stored code (e.g., in a memory) by a local hardware processor. Alternatively or additionally, computing device 108 is implemented as an external server that remotely communicates with point cloud sensor(s) 102 of vehicle 104, optionally with multiple vehicles 104. Computing device 108 may be implemented as a virtual computing device.

Computing sub-systems 112A are installed within vehicle 104, for example, multiple electronic control units (ECU) that execute various functions within the vehicle, and/or transmission control unit (TCU) that controls the transmission of the vehicle.

One or more vehicle network(s) 112B are installed within vehicle 104. Networks 112B connect different electronic and/or computing sub-systems 112A within the vehicle, and/or that connect computing sub-systems 112A of the vehicle to externally located computing devices (e.g., using a wireless connection and/or wired connection). Exemplary networks include: canvas, can-fd, flexray, and Ethernet.

Vehicle 104 may include one or more communication interfaces 114 that interface with computing device 108, and/or point cloud sensor(s) 102, and/or third party server(s) 116. Exemplary communication interfaces 114 include: a wireless transmitter(s) (e.g., antenna(s) which may also act as receivers), a wired connection, a software communication interface (e.g., virtual interface), and/or a hardware communication interface (e.g., network interface card, network interface cable connection, antenna).

Computing device 108 may include one or more communication interfaces 118 for communicating with point cloud sensor(s) 102, with sub-systems 112 of vehicle 104, and/or with third party server 116. Exemplary communication interfaces 118 include: a wireless transmitter(s) (e.g., antenna(s) which may also act as receivers), a wired connection, a software communication interface (e.g., virtual interface), and/or a hardware communication interface (e.g., network interface card, network interface cable connection, antenna).

Processor(s) 106 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 106 may include one or more processors (homogenous or heterogeneous), which may be arranged for parallel processing, as clusters and/or as one or more multi-core processing units, for example, distributed across multiple virtual and/or physical servers, for example, located within a computing cloud and/or at multiple network connected processing nodes.

Data storage device (also referred to herein as memory) 110 stores code instructions for execution by processor(s) 106. Data storage device 110 may be implemented as, for example, a random access memory (RAM), read-only memory (ROM), and/or a storage device, for example, non-volatile memory, magnetic media, semiconductor memory devices, hard drive, removable storage, and optical media (e.g., DVD, CD-ROM).

Computing device 108 may include and/or be in communication with a data repository 120 (also referred to herein as data storage device 120) for storing, for example, a history of executed instructions, and/or a history of received data from point cloud sensor 102. Computing device 108 may be implemented as, for example, memory, hard drive, optical disc, storage device, remote storage server, and/or cloud server.

Computing device 108 includes and/or is in communication with one or more user interface 122 for viewing data (e.g., generated warning indications) and/or that include a mechanism for the user to enter data (e.g., define a user profile). User interface(s) 122 may be integrated with a display installed in the vehicle, and/or be implemented as a separate device for example, as the user interface of the mobile device of the user. User interface(s) 122 may be implemented as, for example, a touchscreen, a keyboard, a mouse, and voice activated software using speakers and microphone.

Computing device 108 may communicate with a remotely located third party sever 116, for example, an insurance server, and/or a statistical analysis server that computes the classifier(s). Computing device 108 may communicate with third party server 116, for example, over a network 124 via a network interface 126. Exemplary networks 124 include: the internet, a local area network, a wide area network, a virtual network (e.g., virtual private network), a wireless network, a cellular network, a short range temporary network, and a local area network. Network interface 126 may include one or more antennas and/or transceivers providing wireless network communication, and physical and/or virtual network connections, for example, network interface card(s) and/or software network interfaces. Network interface 126 may be installed within the vehicle itself, and/or exist as an external component used for other purposes, for example, the wireless network interface of a mobile device of the user.

Computing device 108 may be in communication with an accelerometer 150 that senses acceleration and/or deceleration of vehicle 104. Accelerometer 150 may be installed within vehicle 104 (e.g., within one or more sub-systems 112A) and/or accelerometer 150 may be installed within computing device 108. The acceleration and/or deceleration data outputted by accelerometer 150 may trigger one or more events for computation and/or analysis of the point cloud. The events may be associated with a tag and/or label (e.g., metadata, pre-classified event) assigned to the data; for example, when the car is accelerating fast (e.g., an indication of reckless driving), when the car is decelerating quickly (e.g., indication of a collision about to occur or a near collision), when the car is not accelerating and/or decelerating (e.g., car is stopped), and/or accelerating and/or decelerating within a ranged defined as normal (e.g., car is driving normally). The event identified based on data outputted by the accelerometer 150 may trigger one or more features described with reference to FIGS. 3-10. Alternatively or additionally, the data outputted by the accelerometer 150 may be analyzed in association with the point cloud data, for example, to identify reckless driving based on abnormal gestures identified based on the point cloud and fast acceleration and/or deceleration. Alternatively or additionally, the data outputted by the accelerometer 150 may be analyzed in association with one or more point clouds (e.g., a sequence and/or video of point clouds captured over time) to differentiate and/or classify identified motion, for example, to differentiate between global movement of the entire care which is captured by the output of accelerometer 150 (e.g., strong wind rocking the car, car slipping on a slipper surface, acceleration and/or deceleration motion of the car) and micro-vibrational movement (e.g., heartbeat and/or gestures and/or motion of passengers and/or driver).

Figure 2:
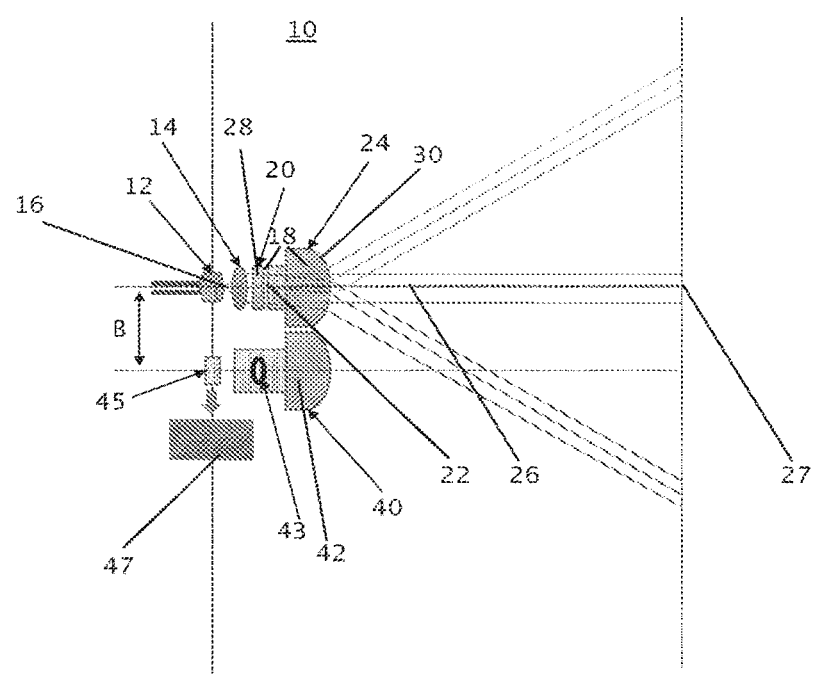
FIG. 2 is a schematic of an exemplary implementation of a point cloud sensor(s), in accordance with some embodiments of the present invention.

Reference is now made to FIG. 2, which is a schematic of an exemplary implementation of point cloud sensor(s) 102, in accordance with some embodiments of the present invention.

International patent application No. WO2016103271 by Applicant discloses a speckle analysis system which utilizes eye-safe, low power light radiation (e.g., class I laser) and unique speckle analysis algorithms to detect vibrations from a surface of an object or subject in any environment and in real time. Computing device 108 and/or sensor 102 may incorporate a speckle analysis approach such as that described in WO2016103271 to analyze speckles formed by the projected pattern and derive surface vibration information indicative of presence and movement of a human or pet, for example, a child or pet left in a car.

Sensor 10 includes a light source 12 having a collimating lens 14 for generating a collimated beam 16. Light source 12 can include a laser diode generating a beam with a wavelength of 830 nm (NIR) and a total power of about 3 W.

It is noted that the optical setup described with reference to FIG. 2 is exemplary and not necessarily limiting. For example, multiple light sources 12 may be implemented, for example, 4 emitting lasers.

Light source 12 may be implemented as, for example, a diode laser having a wavelength of 800-1000 nm. The beam projected by light source 12 may be collimated by an aspheric lens 0.5-5 mm in diameter. The collimated beam may be 2-5 mm in width and can be focused to a distance of 1-1.5 m. The collimated beam may be split by a diffractive optical element (DOE) into dots of 0.7 mW (class1 laser at 830 nm) each. The total power (typically about 0.1-10 Watts) is calculated by the power requirement for each spot (class1 laser power limit).

The beam can be collimated by a 3 mm focal length, 2 mm diameter, aspheric lens to create a 2 mm wide collimated beam.

Sensor 10 may include an optical device 18 including a first optical component 20 for converting collimated beam 16 into a structured light pattern 22 and a second optical component 24 for distorting structured light pattern 22 into a distorted light pattern 26 projectable onto a surface 27 (object plane).

First optical component 20 is preferably a DOE 28, which may be a single element capable of phase/attenuation modulation or creating a diffractive pattern or is a micro lens array.

DOE 28 generates a dot matrix pattern of 61×61 dots (also referred to herein as spots). DOE 28 may generate a dot matrix of 10-1000 dots in each dimension. The adjacent angle between dots may be 0.01-5 degrees in both X- and Y-axis. The total field angle may be 10-80 degrees (in each axis) and the size of the DOE may be 1-10 mm×1-10 mm.

DOE 28 generated pattern may be distorted by an afocal fisheye lens having an FOV of 160-220 degrees and F-theta distortion of between −30% and +15%.

The second optical device may include a similar fisheye lens capable of generating an image circle 2-5 mm diameter.

The imaging sensor can be a CMOS/CCD sensor with a pixel size of 1-10 μm and an HD/FHD/VGA resolution. Code when executed identifies the captured image spots, measures the shift (depth) of each spot from a reference (projected) location, reconstructs the depth by calculation and/or comparing shift length to a look-up table and/or comparing spot depth with adjacent spots to increase depth certainty.

The adjacent angle between dots is 0.57 degrees (X- and Y-axis) with a total field angle of 34×34 degrees. The pattern can be rectangular with an area of 3×3 mm (larger than collimated beam 16).

When projected onto a surface, structured light pattern 22 forms a square-shaped dot matrix including 61×61 dots, spaced 10 mm at distance of 1 m apart (see FIG. 2A).

DOE 28 is positioned along the path of collimated beam 16 1-2 mm away from the beam source. The position and orientation of DOE 12 can be preset and fixed or it can be varied by mounting DOE 12 on a movable platform (which can be motorized).

Second optical component 24 is preferably an afocal fisheye lens 30 having an FOV of 200 degrees. The angle of view of distorted light pattern 26 and the FOV are greater than that of structured light pattern 22. The angle of view of distorted light pattern 24 (in the X- and/or Y-axis) can be 50-200 degrees.

Fisheye lens 30 is positioned along the path of beams forming structured light pattern 22, such that DOE 28 is positioned in an aperture plane of afocal fisheye lens 30. The position and orientation of afocal fisheye lens 30 can be preset and fixed or it can be varied by mounting fisheye lens 30 on a movable platform (which can be motorized).

Distorted light pattern 26 can be racially distorted by fisheye lens 30 to form a dot matrix such as that shown in FIG. 2B. Alternative shapes for distorted light pattern can be a rectangle stretched along the X- or Y-axis.

In order to acquire information from an environment, sensor 10 projects distorted light pattern 26 onto surfaces in the vehicle cabin and captures the returned light via a second optical device 40.

Second optical device 40 includes a fisheye lens 42 for capturing light reflected from the surfaces (representing distorted light pattern 26) and converting distorted light pattern 26 into a non-distorted pattern which can be similar or identical in shape to structured light pattern 22. Fisheye lens 42 can have an FOV of 200 degrees, an image circle 3.5 mm diameter and an equivalent focal length (EFL) of 1.05 mm.

The optical components of system 10 can be set up as follows. First and second lenses (30 and 42, respectively) are positioned side by side at the same height (optical axis) with a distance therebetween (referred to as backbone B, FIG. 1) set at 50 mm.

The longer the backbone, the better depth resolution, however, a backbone that is too long can lead to overlap of spots (when significant depth difference is represented by adjacent spots).

Although a distorted pattern may be processed to derive surface information, converting distorted light pattern 26 into a non-distorted pattern similar or identical in shape to structured light pattern 22 (as effected by system 10 of the present invention) greatly facilitates identification of dots (each dot should be placed at specific region—grid), especially when sunlight and other bright objects are present. In addition, since the spatial resolution of the depth map is fixed, there is no need for interpolation in order to register dots to the 2D image.

The non-distorted pattern generated by system 10 is projected onto an imaging device 45 (CCD/CMOS) having a pixel size of 3.75 μm, a resolution of 1280×960 and an active region 4.8×3.6 mm in area.

Information relating to position and intensity is collected over time with respect to each dot of the dot matrix acquired from the surface and processed via processor 47 (which may be implemented as processor(s) 106 of computing device 108, and/or may be an independent processor integrated within sensor 102). A point cloud is computed, which is further processed as described herein to compute instructions for adjustment of one or more vehicle sub-systems, for example, ECUs executing various in-car applications and/or vehicle safety systems.

Figure 3:
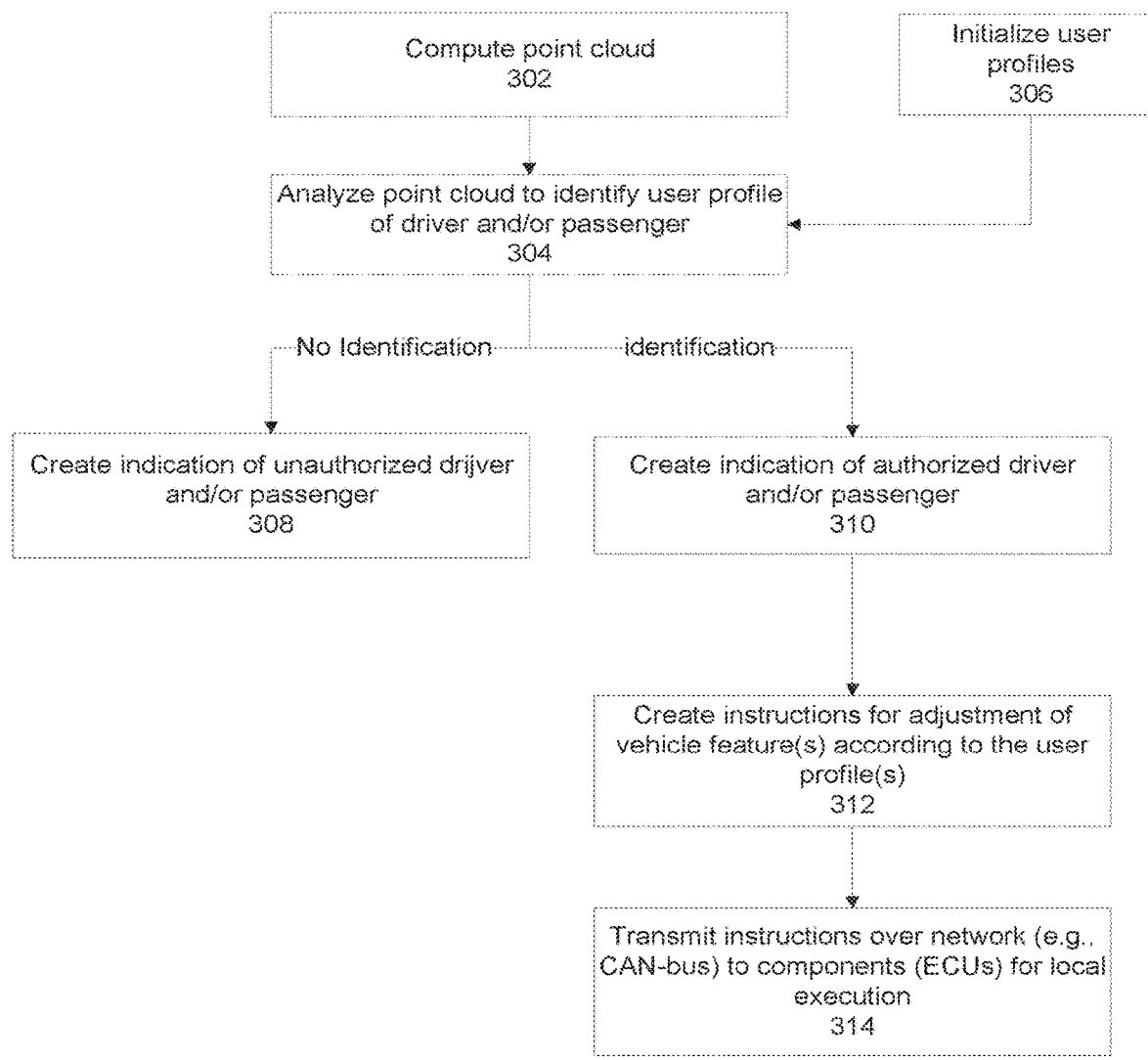
FIG. 3 is a flowchart of a process of generating instructions for adjustment of one or more vehicle sub-systems based on identification of the driver of the vehicle and/or passengers in the vehicle according to the cloud point outputted by the point cloud sensor, in accordance with some embodiments of the present invention.

Reference is now made to FIG. 3, which is a flowchart of a process of generating instructions for adjustment of one or more vehicle sub-systems based on identification of the driver of the vehicle and/or passengers in the vehicle according to the cloud point outputted by the point cloud sensor, in accordance with some embodiments of the present invention. The features described with reference to FIG. 3 may be executed based on output of sensor(s) 102 processed by code 118A stored in memory 110 executed by processor(s) 106 of computing device 108.

Optionally, sensor 102 is installed above the head of the driver and/or passengers, for example, on the room of the intra passenger compartment of the vehicle.

At 302, the point cloud is computed based on output of sensor 102. The point cloud is computed by sensor 102 and/or computing device 108, for example, as described with reference to FIG. 2. The point cloud includes depth data indicative of depth and/or location of points within the cloud. Multiple point clouds may be obtained, for example, as a sequence of images and/or a video. The multiple point clouds may be analyzed relative to one another, for example, determining motion of individual and/or sets of points of the point cloud. Micro-movements may be identified based on the analysis of the sequence of point clouds.

The user may be instructed (e.g., by audio and/or a video playing on a display) to enter a certain position for identification, for example, both hands on the wheel, head on the headrest, back against the seat, and looking straight ahead.

At 304, the point cloud is analyzed to identify the identity of the driver and/or passenger(s), optionally according to a user profile. An indication of the identity of each occupant may be computed, and matched to a respective user profile. The user profile may be stored in a profile database, for example, within a user profile data repository 120A stored in data repository 120 of computing device 108.

User profile data repository 120A may store:
User profiles of users authorized to drive in the vehicle and/or be passengers in the vehicle.
User profile of users not allowed to drive the vehicle (e.g., drivers with revoked licenses, drives without insurance coverage).
User profile of users not allowed to be passengers in the vehicle (e.g., users that caused vandalism to the vehicle).

The driver and/or passengers may be identified, for example, base on a correlation of the acquired point cloud with the point clouds stored as user profiles. A successful match (within a correlation threshold that takes into account variations, for example, movement of the neck) identifies the driver and/or passengers according to the matching user profile(s).

At 306, the user profile is pre-acquired, for example, by an initialization step in which a point cloud of the driver and/or passenger(s) is first acquired. The user may be instructed (e.g., by audio and/or a video playing on a display) to enter the certain position for identification.

The user profile may store user specific features collected from the driver and/or passenger, for example, a point cloud that includes the counter of the ear(s), and/or the head and/or the shoulder(s) of each user.

At 308, when the driver and/or passenger is identified as prohibited from driving the vehicle and/or not matched to an entry associated with a user allowed to drive the vehicle, an indication of unauthorized attempt at driving the vehicle and/or unauthorized passenger is created.

The indication may trigger one or more of:
An audio and/or video message (e.g., displayed on a display associated with the vehicle and/or played over speakers) stating that the user is prohibited from driving the car and/or driving in the car.
A signal that prevents ignition of the car.
A message to a monitoring server (e.g., third party server 116) indicative of an unauthorized attempt at driving the car. For example, a message is transmitted to a security company that then sends a patrol car to investigate possible theft of the vehicle.

Alternatively at 310, when the driver and/or passenger(s) are identified as allowed to drive the car, and/or be driven, and/or not matched to records prohibiting driving the car and/or prohibiting being driven, an indicative of authorized attempt at driving the vehicle and/or authorized passenger is created.

The indication may trigger a signal that enables ignition of the car. Alternatively, the ignition of the car is enabled when one or more vehicle parameters have completed automatic adjustment, as described with reference to act 312.

At 312, instructions are created by computing device 108 for transmission to one or more vehicle sub-systems 112A (e.g., ECU) over the vehicle network 112B (e.g., CAN-bus) for automatically adjusting one or more vehicle features according to the user profile. Each user profile may be associated with customized vehicle parameters, and/or general vehicle parameters, for example, stored as metadata and/or values of predefined fields stored in a database associated with the user profiles and/or stored in a record of the user profile.

Exemplary general vehicle parameters include: each passenger must be strapped in with a seat belt, or within a car seat. An ECU associated with the seat belt may be queried to determine whether the seat belt is activated or not. When no seat belt is attached to one or more passengers and/or the driver, a reminder message may be created, for example, a light is activated, and/or an audio message is played over speakers and/or a video and/or image is displayed. Another example of a general vehicle parameter includes detection of a child car seat, for example, by a trained classifier that classifies the point cloud into a car seat indication. When a car seat is found, the seat belt ECU and/or other locking mechanism ECU may be queried to determine whether the car seat is securely attached to the vehicle. Air bags near the car seat may be automatically shut off by computing device 108 sending instruction messages over the vehicle network to the air bag ECU.

Exemplary user specific parameters include: height of seat, seat angle, seat displacement, and mirror angles. The user specific parameters may be predefined for the driver and/or passenger, and stored within the user profile. Alternatively, the user specific parameters are dynamically computed based on the height, and/or weight, and/or posture and/or gesture of the driver and/or passenger.

Additional user specific parameters include: window state (e.g., open, close, partially open), set air temperature, and set radio station.

Optionally, the control provided over one or more vehicle parameters is set according to the user profile. The user profile may define allowable controls of the user over the car. The control may be customized per user, and/or the control may be defined for a group of users. For example, when a child is detected based on point cloud, the child may be prevented from opening a window according to the user profile that prohibits children (e.g., defined by weight and/or height and/or based on identified identity) from opening the car window. In another example, only the user in the driver seat may be allowed to control the radio, for example to prevent distraction of the driver by other passengers playing with the radio. In yet another example, the driver and the front passenger may be allowed to control the air conditioner, for example, to prevent passengers sitting in the rear of the vehicle from leaning forward to adjust the air conditioner.

Computing device 108 may automatically adjust the seat and/or mirror and/or window and/or air conditioner and/or radio according to the user profile and/or dynamically computed values, by creating instructions that are transmitted to the relevant ECUs over the vehicle network for execution by the target ECUs.

At 314, computing device 108 transmits the generated instructions over the vehicle network 112B (e.g., CAN-bus) to the target sub-systems 112A (e.g., ECUs). The target sub-systems execute the instructions for adjustment of vehicle features accordingly.

Figure 4:
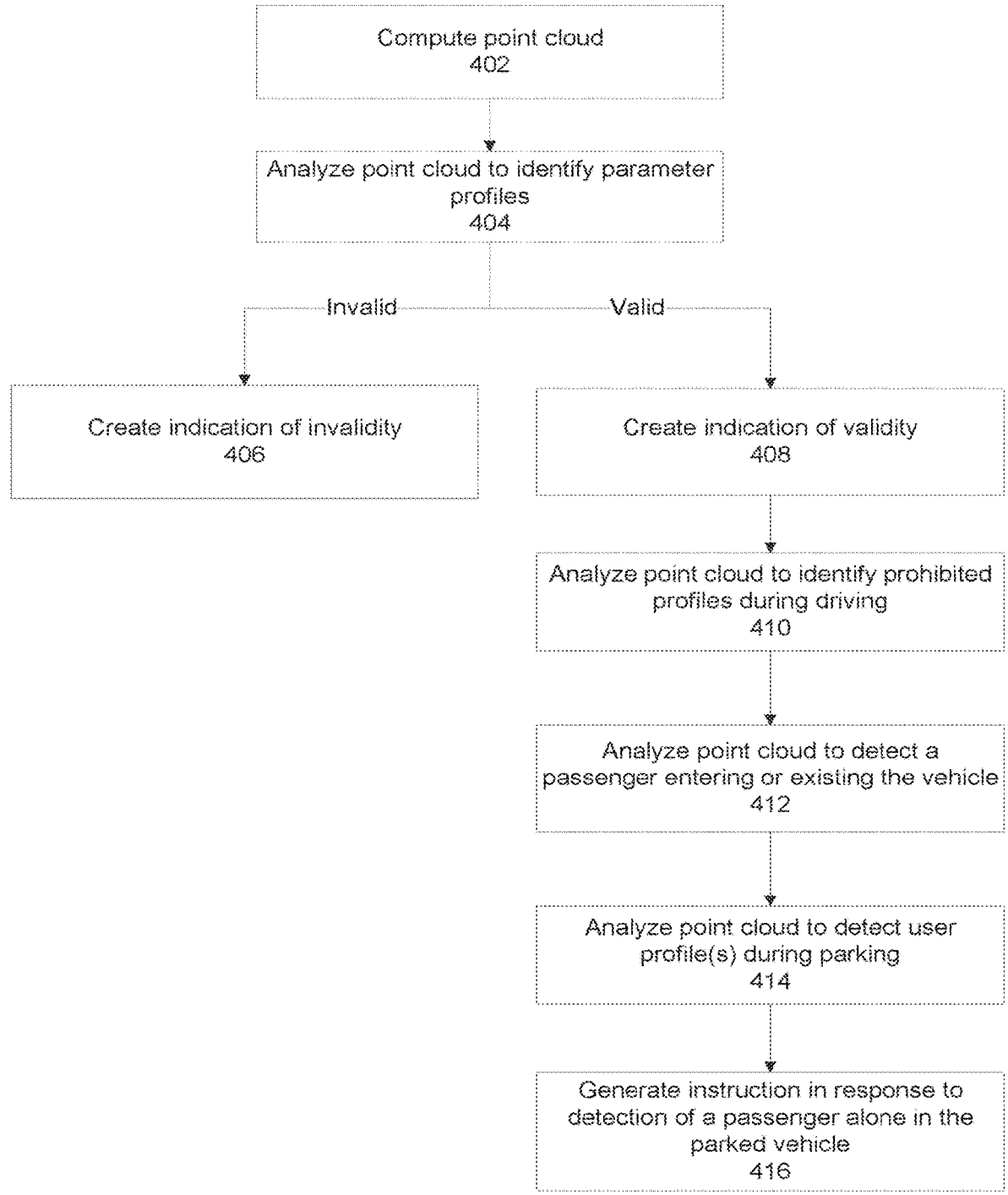
FIG. 4 is a flowchart of a process of generating instructions for adjustment of one or more vehicle sub-systems based on identified allowed and/or prohibited profile parameters of the driver of the vehicle and/or passengers in the vehicle according to the cloud point outputted by the point cloud sensor, in accordance with some embodiments of the present invention.

Reference is now made to FIG. 4, which is a flowchart of a process of generating instructions for adjustment of one or more vehicle sub-systems based on identified allowed and/or prohibited profile parameters of the driver of the vehicle and/or passengers in the vehicle according to the cloud point outputted by the point cloud sensor, in accordance with some embodiments of the present invention. The method described with reference to FIG. 4 may be executed simultaneously with the method described with reference to FIG. 3, and/or after execution of the method described with reference to FIG. 3. The features described with reference to FIG. 4 may be executed based on output of sensor(s) 102 processed by code 118A stored in memory 110 executed by processor(s) 106 of computing device 108.

At 402, the point cloud is computed based on output of sensor 102. The point cloud is computed by sensor 102 and/or computing device 108, for example, as described with reference to FIG. 2. The point cloud includes depth data indicative of depth and/or location of points within the cloud. Multiple point clouds may be obtained, for example, as a sequence of images and/or a video. The multiple point clouds may be analyzed relative to one another, for example, determining motion of individual and/or sets of points of the point cloud. Micro-movements may be identified based on the analysis of the sequence of point clouds.

At 404, the point cloud is analyzed to identify driver and/or passenger parameter profiles. The profiles may include allowed and/or prohibited parameters. Alternatively or additionally, the profiles are indicative of allowed and/or prohibited behavior.

The cloud point may be analyzed to determine where the driver and/or passenger are located. For example, an initial point cloud captured of an empty passenger compartment is compared to the currently acquired point cloud. The two point clouds are analyzed relative to one another to determine the location of passengers and/or drivers.

Inanimate objects (e.g., box, backpack, doll) may be distinguished from human and/or pet passengers, for example, by analyzing a set of sequential point clouds to detect motion. Inanimate objects are detected by lack of motion, and humans and/or pets are detected by identifying at least micro motion indicative of breathing and/or a heartbeat. Inanimate objects may be tracked, for example, by identifying whether the inanimate object is left in the vehicle after all passengers have exited. A reminder may be generated prior to the passengers existing the vehicle (e.g., when the vehicle is turned off) and/or after all passengers have left. The reminder may be played over the car's audiovisual system, and/or transmitted to a mobile device of the driver and/or passengers. For example, an audio message played over the speakers reminding of the object and/or an image of the object may be presented on the display as a reminder it is left in the vehicle.

Optionally, inanimate objects that experience rapid movement due to matter fatigue and/or high volume audio (e.g., played by the infotainment system) are detected. Such inanimate objects may be distinguished from living passengers (e.g., humans, pets), for example, by regular motion at a certain frequency of the inanimate object versus irregular motion and/or variable motion of the living passenger.

The prohibited driver and/or passenger parameter profiles may include a set of rules that define allowed locations of the driver and/or passengers. The exemplary rules may be stored in a rule database 120B stored by data storage device 120 of computing device 108. The rules may be, for example, manually defined by a user, automatically generated by code instructions, and/or downloaded from a central site (e.g., insurance server, police server).

Exemplary rules include:

No more than one passenger per seat belt.

No passengers are allowed in the trunk.

No passengers are allowed to sit on the floor.

No passengers are allowed to sit behind seats.

No passenger below a predefined weight and/or height is allowed to sit at the driver's seat and/or at the front passenger seat (e.g., prevent children from sitting at the driver's seat and/or front passenger seat).

At 406, an indication of invalidity is created for the profile(s), optionally when one or more rules are found invalid. The indication may trigger a signal preventing ignition of the car. The indication may trigger, for example, a warning light, an audio message played over a speaker, and/or a video message displayed on a screen, indicating the reason the car cannot be started. The audio and/or video may provide instructions on how to fix the reason the car cannot be started, for example, child is not allowed to sit in the front passenger seat, and must move to the back seat.

Alternatively, at 408, an indication of validity is created, optionally when the rules are found to be valid. The indication may trigger a signal enabling ignition of the car.

At 410, when the vehicle is in motion, and/or temporarily stopped (e.g., at a red light, at a stop sign, in a traffic jam), for example, gear in drive, the current point cloud and/or additional point clouds are collected and analyzed to identify prohibited driver and/or passenger profiles during driving according to rules. The passenger compartment of the vehicle is monitored, optionally continuously (or close to continuously) by the analysis of the sequence of point clouds.

Point clouds may be collected, for example, at predefined intervals, for example, every second, or 5 seconds, or 10 seconds, or at predefined events, for example, when a significant change is detected, for example, displacement of a passenger.

Exemplary rules include:

No changing seats.

No standing up.

No leaning across seats.

No limbs out the window.

When a violation of the set of rules is detected, an indication of invalidity is created, and a message (e.g., audio and/or video) indicating the reason for invalidity and/or how to correct the invalidity is generated, for example, as described with reference to act 406.

At 412, alternatively or additionally, the point cloud is analyzed to detect when a new passenger entered the vehicle, and/or when an existing passenger left the vehicle. The entering and/or exiting passenger may be detected when the engine is running, but the car gear is in park, or the gear is in drive with the brake being pressed. The state of the gear and/or brake may be detected by querying the gear and/or brake ECU over the car network.

The identity of the new passenger and/or the existing passenger may be determined (e.g., as described with reference to FIG. 3). A timestamp may be associated with the event of entry and/or exit. A geographical location (e.g., street address, coordinates) may be associated with the event of entry and/or exit.

The entry of the passenger and/or exit of the passenger may be correlated with a data record indicating a predefined location and/or time for pickup of the passenger, and/or a predefined location and/or time for drop-off of the passenger. For example, the passenger entering the car used their mobile phone to call for a driver service for pick-up at a certain address at a certain time. When the passenger enters the vehicle, a search is performed to determine whether a matching record of pick-up at the geographical location at the certain time is identified. An error message indicating that the passenger entered the wrong car may be generated when no matching entry is found. When the passenger is dropped off at the correct geographical location according to the request from drop-off submitted by the passenger, the passenger may be automatically billed for the service and/or billed according to total travel time, for example, by sending a message indicating successful completion of the transportation to a billing server.

Optionally, the total number of passengers in the vehicle is tracked as passengers enter and exit the vehicle. When the total number of passengers in the vehicle is determined to be above the number of available seats and/or exceeds the total number of allowed passengers (which may be stored in a database and/or computed based on an analysis of the point cloud), appropriate action may be taken (e.g., according to rules stored in a database). Exemplary actions include: computing device 108 sends a message over the vehicle network to the ignition sub-system to shut down the engine, prevent moving the gear into drive, and/or to generate an indication message (e.g., audio and/or video) that the number of allowed passengers has exceeded the limit and the passengers must exit to allow the vehicle to drive. An indication may be transmitted to the third party server, for example, law enforcement, insurance, and/or owner of the car (e.g., rental company), indicative of the attempt at overloading the vehicle with passengers.

At 414, when the vehicle is parked (e.g., gear in park), point clouds are collected and analyzed relative to a set of rules indicative of allowed and/or prohibited user profiles during parking.

The set of rules may be indicative of a small child forgotten in the passenger compartment. For example, no passenger in a passenger seat below a predefined weight is allowed when there is no passenger in another passenger seat above another predefined weight, indicating that no baby may be left alone unsupervised when there is no adult in the car. In another example, localized small movements without large displacement may be indicative of a small child that is moving his/her head, arms, and/or legs, while the body remains fixed due to being strapped in a car seat.

The set of rules may be indicative of a driver and/or passenger that fell asleep in the passenger compartment. For example, micro movements indicative of breathing are detected for the passengers remaining in the car, without large scale limb and/or displacement motion.

At 416, when a passenger (determined to be a baby or small child based on an analysis of weight and/or height and/or according to the identified identity as described herein) is determined, based on an analysis of the point cloud, to be present alone in the parked vehicle (e.g., forgotten, fallen asleep), computing device 108 may generate one or more message in an attempt to save the passenger from an undesired situation, for example, to prevent the baby and/or passenger from heating up in a hot car, and/or being hit by other cars.

The instructions are transmitted over the vehicle network (e.g., CAN-bus) to the target vehicle sub-systems (e.g., ECUs) for local execution of the instructions.

Computing device 108 may transmit one or more messages, for example:

- To a sub-system controlling the air conditioner, to cool the air in the passenger compartment, to prevent overheating of the compartment on a hot and/or sunny day.
- To a sub-system controlling the radio and/or CD player, to play music and/or the radio, optionally at a loud volume, in an attempt to wake up the sleeping passenger.
- To a sub-system controlling headlights and/or emergency lights of the vehicle, to turn the lights on and off at a defined pattern, in an attempt to alert nearby passengers that the baby is forgotten in the car.
- To third party server 116 over network 124, and/or to a mobile device of the driver over network 124, indicating that there is a passenger(s) remaining in the parked vehicle.

Figure 5:
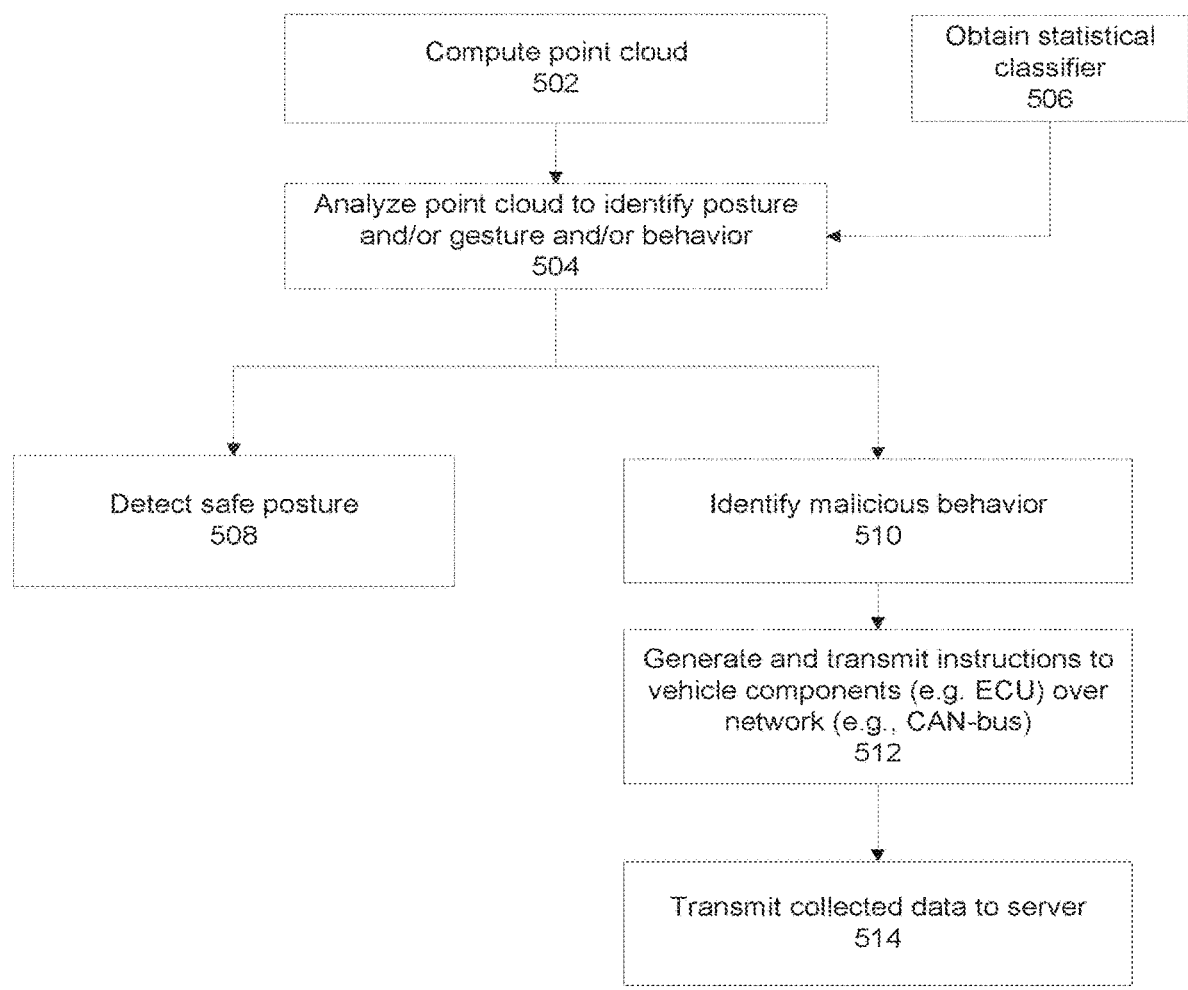
FIG. 5 is a flowchart of a process of generating instructions for adjustment of one or more vehicle sub-systems based on monitoring driver and/or passenger posture and/or gesture during driving according to the cloud point outputted by the point cloud sensor, in accordance with some embodiments of the present invention.

Reference is now made to FIG. 5, which is a flowchart of a process of generating instructions for adjustment of one or more vehicle sub-systems based on monitoring driver and/or passenger posture and/or gesture during driving according to the cloud point outputted by the point cloud sensor, in accordance with some embodiments of the present invention. The method described with reference to FIG. 5 may be executed simultaneously with the method described with reference to FIG. 3 and/or FIG. 4, and/or after execution of the method described with reference to FIG. 3. The features described with reference to FIG. 5 may be executed based on output of sensor(s) 102 processed by code 118A stored in memory 110 executed by processor(s) 106 of computing device 108.

At 502, the point cloud is computed based on output of sensor 102. The point cloud is computed by sensor 102 and/or computing device 108, for example, as described with reference to FIG. 2. The point cloud includes depth data indicative of depth and/or location of points within the cloud. Multiple point clouds may be obtained, for example, as a sequence of images and/or a video. The multiple point clouds may be analyzed relative to one another, for example, determining motion of individual and/or sets of points of the point cloud. Micro-movements may be identified based on the analysis of the sequence of point clouds.

At 504, one or more point clouds, optionally a sequence of point clouds, are analyzed to identify posture and/or gesture and/or behavior patterns of the driver and/or passengers. The point cloud may be classified into one of a set of predefined posture and/or gesture, for example, by one or more trained classifiers. The trained classifiers 120C may be locally stored by data repository storage device 120 of computing device 108.

The point clouds may be segmented to identify a subset of points that correspond to the hands and/or head of the driver. The classifier may process the segmented points, rather than the entire point cloud, to improve accuracy of classification and/or perform the classification faster and/or using fewer computational resources (since the segmented points are much fewer than the entire point cloud set).

At 506, trained classifier(s) 120C are obtained, from example, from third party sever 116. The classifier(s) 120C may be downloaded from server 116 to computing device 108 over network 114, and/or computing device 108 may access a centrally stored classifier(s) stored on server 116, for example, over network 114 via a software interface (e.g., application programming interface (API), software development kit (SDK), an application that accesses server 116, and/or via a web site access).

Classifier(s) 120C may be trained, for example, by sequences of point clouds received from multiple vehicles (actual on-road vehicles, and/or simulated vehicles) and associated indications of the category of posture and/or gesture within the associated point cloud. The category may be stored, for example, as metadata and/or a tag associated with the data of the point cloud. The category may be manually entered by a user viewing the point cloud, for example, a user viewing a video of the interior of the car that is synchronized with a sequence of point clouds. The user manually determines the posture and/or gesture at a certain time of the video, and assigned a metadata tag of the posture and/or gesture to the point cloud at the corresponding time. Alternatively or additionally, the category may be automatically created by code instructions. For example, sequences of point clouds that occurred right before an accident (e.g., 1-10 seconds or 10-30 seconds, or other time periods prior to the accident) or before an avoided collision or during an accident may be automatically categorized as dangerous behavior. Sequences of point clouds that occurred right before being stopped by police (e.g., 1-10 seconds, 30-60 seconds, or other time frames) may be automatically categorized as risky behavior. Sequences of point clouds that occurred during an uneventful drive may be automatically classified as safe behavior.

The classifier(s) may be trained, for example, based on supervisory and/or unsupervised approaches. The classifier(s) may include a statistical classifier(s). Exemplary training methods include: regression analysis, decision trees, support vector machines (SVM), neural network, k-nearest neighbor, and a linear classifier.

At 508, safe posture and/or gesture of the driver and/or passenger is detected. The safe posture may be detected, for example directly by the classifier, and/or based on an analysis of one or more postures determined by the classifier.

For example safe posture and/or gesture of the driver may include a combination of the following: two hands on the wheel (allowing for short breaks, for example, to adjust the radio, or to scratch the face), head motion to look at rear view mirror and side mirrors, and constant occupancy of the driver seat.

When safe posture and/or gesture is detected, the vehicle may continue driving without generating indications of unsafe posture and/or gesture.

The posture and/or gesture of the driver and/or passengers is automatically determined, optionally continuously. Posture and/or gesture may be computed at predefined time frames, for example, every 1 second, or 5 seconds, or 10 seconds, or 15 seconds. Posture and/or gesture may be computed based on a trigger, for example, significant displacement of a limb and/or body according to a requirement.

The posture and/or gesture of the driver and/or passengers may be determined, for example, before starting the engine, during driving, and/or to make sure that the car is completely stopped before unlocking the doors to let passengers exit.

At 510, malicious behavior of the driver and/or passenger(s) is identified. As used herein, the term malicious behavior refers to dangerous behavior, and/or illegal behavior, and/or abnormal behavior indicative of a problem.

The malicious behavior may be identified, for example, by the classifier classifying the posture and/or gesture as malicious behavior (or a classifying type identified as malicious behavior), and/or by an analysis of the classified posture and/or gesture (e.g., according to a set of rules).

The malicious behavior may be identified, for example, based on an analysis of the location and/or direction of the head and/or hands of the driver, for example, to determine whether the driver is paying attention to the driver or distracted from driving.

Exemplary malicious behavior includes:
Quick and/or sharp limb movements (e.g., swearing at other drivers and/or passengers).
Contact with other passengers, optionally repeated contact (e.g., hitting other passengers, sexually inappropriate behavior).
Abnormal gestures of limbs and/or body and/or head (e.g., seizure, heart attack, onset of psychiatric illness).
Lack of limb and/or head gestures and/or body movement when limb and/or head gestures and/or body movement is expected, indicative of driver fatigue and/or distraction.
Driver driving while holding a phone to their ear.
Driver turning around during driving to look at the back seat.
Driver looking at a direction other than the front of the vehicle above a predefined threshold (e.g., 2-3 seconds), for example, reading a message on a smartphone, looking at a newspaper located on the passenger seat.
Driver not holding steering wheel.
Driver holding steering wheel with one hand.

At 512, computing device 108 generates and transmits instructions to one or more sub-systems (e.g., ECUs) 112A of vehicle 104 over network 1128 (e.g., CAN-bus) according to the detected malicious behavior. The instructions may be automatically generated and/or obtained from a database of predefined instructions, for example, by an analysis of the malicious behavior. The analysis may be performed, for example, based on a set of rules and/or a classifier that analyzes the set of rules and/or other available data (e.g., current state of the car obtained by querying sub-systems, for example, brake status, how fast the car is travelling) and map the malicious behavior to an action and/or associated instructions.

Optionally, the instructions transmitted by computing device 108 include playing an audio message over speakers and/or presenting an image on a display and/or presenting a video on a display and/or activating a light of an icon, indicating that malicious behavior is detected and issuing a warning to stop the malicious behavior. For example, a passenger is sitting in a dangerous position.

Alternatively or additionally, instructions transmitted by computing device 108 include safety mitigation procedures. The instructions may be transmitted when the issued warning is ignored for a predefined period of time, for example, after 10 seconds, or 30 seconds.

Exemplary safety mitigation instructions include:
Transmitting instructions to the airbag sub-system to deactivate one or more airbags when the passenger and/or driver are sitting in a dangerous position.
Automatically and safely instructing the vehicle to stop at the side of the road, for example, by transmission of instructions to sub-systems handling emergency stopping.
Reducing the volume of music playing in the car.
Disconnecting the phone from the car speaker system.
Transmitting instructions to lower a shade to block sun, for example, when behavior of the driver and/or passenger indicates the user(s) is being blinded by the sun.

For example, the driver's head is positioned at an abnormal location for a prolonged period of time to avoid the sun, and/or the driver's hand is positioned as a shade over the eyes of the driver to block out the sun.

At 514, the data collected indicative of safe posture and/or gesture and/or malicious behavior may be transmitted to a remote server (e.g., third party server 116) for analysis, for example, wirelessly over network 124. Additional data may be transmitted, for example, a vector storing values of parameters indicative of the current state of the vehicle, which may be obtained as an automatic memory dump and/or by querying relevant sub-systems. For example, the state of the brakes, the state of the lights, the speed of the vehicle, and air temperature within the passenger compartment. Additional transmitted data may include a visual video of the cabin.

The server may collect data from multiple vehicles. Data may be analyzed from multiple vehicles to identify certain scenarios, for example, risk factors (e.g., malicious behavior) that increases the probability of an accident and/or to identify safe practices that reduce the probability of the accident. The analysis may be performed, for example, manually and/or automatically (e.g., by machine learning code such as a neural network and/or classifier). The collected data may be used to update the trained classifier. The centrally updated classifier may be transmitted to multiple vehicles 104 for local storage as classifier 120C within data repository storage device 120 of computing device 108.

The server may collect personalized data of identified users, at the same car or multiple cars (e.g., when the same user rents different cars). The server may analyze the data and/or receive an analysis of the posture and/or gesture and/or behavior of the driver, whether the driver is driving at a safe posture and/or gesture or performing malicious behavior. For example, insurance companies may compute insurance rates for drivers according to the analysis. Drivers with a history of safe driving are awarded low cost insurance, while drivers performing malicious behavior during driving are charged at a higher rate.

Figure 6:
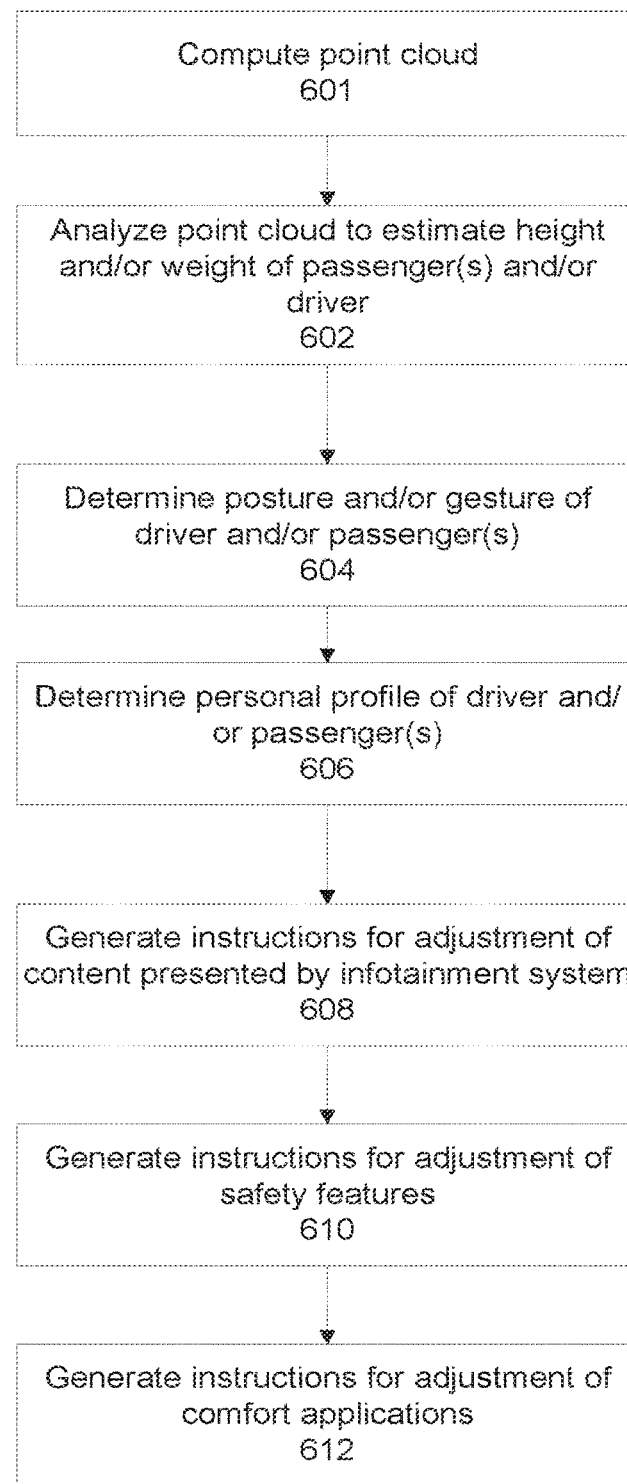
FIG. 6 is a flowchart of a process of generating instructions for adjusting one or more vehicle parameters by vehicle sub-systems according to the occupants in the vehicle detected based on point cloud outputted by the point cloud sensor, in accordance with some embodiments of the present invention.

Reference is now made to FIG. 6, which is a flowchart of a process of generating instructions for adjusting one or more vehicle parameters by vehicle sub-systems according to the occupants in the vehicle detected based on point cloud outputted by the point cloud sensor, in accordance with some embodiments of the present invention. The method described with reference to FIG. 6 may be executed simultaneously with one or more of the method described with reference to FIGS. 3-5 and 7-10, and/or after execution of the method described with reference to FIGS. 3-5 and 7-10. The features described with reference to FIG. 6 may be executed based on output of sensor(s) 102 processed by code 118A stored in memory 110 executed by processor(s) 106 of computing device 108.

At 601, the point cloud is computed based on output of sensor 102, as described herein.

At 602, the point cloud is analyzed to estimate the height and/or weight of the driver and/or passengers. It is noted that each car seat may be classified as being occupied by a passenger, empty, or including one or more inanimate objects. The analysis of the seat may be performed, for example, by an analysis of a correlation between the current point cloud and a point cloud of an empty passenger compartment. Variations in the current point cloud relative to the point cloud of the empty passenger compartment at locations corresponding to seats is indicative of the presence of a passenger or inanimate object. Inanimate objects may be distinguishable by human and/or pet passengers based on detected motion, as described herein.

The point cloud may be segmented according to each seat classified as including a passenger.

The height and/or weight of passengers may be performed, for example, by a comparison of the point cloud (optionally segmented point cloud) with statistical tables storing pre-measured point clouds of different individuals and their respective weight and/or height. The passengers are classified into a category of height and/or weight (e.g., estimated range). The comparison may be performed, for example, based on a trained classifier, a set of rules, and/or a look-up table. In another example, a mathematical model is created based on a sample of point clouds obtained from different individuals of different height and/or weight. The current point cloud may be provided as input into the model for computation of the estimated height and/or weight of the passengers.

At 604, the posture and/or gesture of the driver and/or passengers is determined, as described herein.

At 606, the personal profile of the driver and/or passengers is determined according to an automatic identification of the driver and/or passengers, as described herein.

At 608, instructions are generated for automatic adjustment of content presented by an infotainment system installed in the vehicle. The instructions are generated according to the weight and/or height and/or posture and/or gesture and/or personal profile of the driver and/or passengers.

As used herein, the term data refers to the weight and/or height and/or posture and/or gesture and/or personal profile of the driver and/or passengers.

The content may be automatically selected by determining a content category according to the data. For example, a trained classifier may determine a content category according to the data, a set of rules may evaluate the data to determine a match with one or more rules that are mapped to a content category, and/or a look-up table may match one or more values of the data to corresponding content categories.

For example, when a passenger is detected as looking out the window for long periods of time, content related to outdoors may be presented. When a passenger is shifting in their seat and/or constantly moving, calming content may be presented.

At 610, instructions are generated for setting and/or adjusting one or more safety features by respective vehicle sub-systems according to the weight and/or height and/or posture and/or gesture and/or personal profile of the driver and/or passengers (referred to herein as the data). The adjustments may be performed by computing device 108 generating instructions according to the data, and transmitting the generated instructions over the vehicle network to the relevant sub-systems.

For example:

The sub-system controlling activation of airbags is set to control the power of activation of the respective airbag according to each passenger. The passenger's height and/or weight may be analyzed according to a height/weight segmentation (e.g., categories based on ranges of height and/or weight). The power of activation may be predefined for each height/weight category. Alternatively, the power of activation may be computed by code of a mathematical model that maps height and/or weight to power. For example, the air bag activation is disabled for children, set to normal power for normal height/weight, and set to maximum power for the highest height/weight category. The control of power of activation minimizes danger to the passenger from the airbag deployment.

The sub-system controlling tension of seat belts is set to control the tension of each seat belt (e.g., when the brakes are strongly pressed) according to each passenger. The passenger's height and/or weight may be analyzed according to a height/weight segmentation (e.g., categories based on ranges of height and/or weight). The tension of the seat belt may be predefined for each height/weight category. Alternatively, the tension of the seat belt may be computed by code of a mathematical model that maps height and/or weight to tension. For example, increasing tension is applied to passengers with increasing height and/or weight. The control of tension of the seat belt improves safety, by applying enough tension to hold the passenger in place, but not apply too much tension to injure the passenger.

Crash avoidance systems controlled by ECUs are set and/or adjusted according to the data. For example, the braking system, the car steering, and/or the suspension system are adjusted according to the data.

An analysis of the total weight of the passengers in the vehicle and/or the center of mass of the vehicle (determined by the distribution of passengers within the cabin) is performed for adjustment of the crash avoidance systems. The center of mass may be dynamically and/or continuously computed as passengers change seats. For example, additional breaking distance is required to stop a car filled with tall and/or heavy passengers versus a vehicle with a single driver. The braking system may be engaged earlier and/or with more power for the former case over the latter case. In another example, when tall and/or heavy passengers are all sitting on one side of the vehicle, and no passengers are on the other side, steering may be adjusted to account for the shift in the center of mass of the vehicle.

The following breaking systems may be set and/or adjusted according to the data, to help ensure safe braking of the vehicle: automatic braking system to prevent collision or reduce severity of collision, anti-lock braking system, electronic brake force distribution system, and emergency brake assist system.

One or more central inflating airbags may be installed approximately in the center of the cabin. The power of inflation and/or direction of inflation may be set and/or controlled according to the location of the passengers and/or the weight and/or height of the passengers.

At 612, instructions are generated for setting and/or adjusting one or more comfort applications of the vehicle by respective vehicle sub-systems according to the weight and/or height and/or posture and/or gesture and/or personal profile of the driver and/or passengers (referred to herein as the data). The adjustments may be performed by computing device 108 generating instructions according to the data, and transmitting the generated instructions over the vehicle network to the relevant sub-systems.

For example:

The position of each passenger headrest is automatically adjusted according to the height of the respective passenger.

The amount of air conditioning to obtain a comfortable temperature is computed based on the number of passengers and/or according to the height and/or weight of the passengers. The power and/or target temperature of the air conditioner is computed accordingly. Instructions are transmitted to set the air conditioner accordingly.

The audio system within the vehicle may be adjusted based on the data. For example, taking into account the location of passengers, their weight and/or height, audio performance (e.g., of music) is optimized to allow for active noise cancellation and/or optimal transmission of sound within the cabin of the vehicle.

It is noted that supplementary data indicative of the state of the vehicle may be collected and/or analyzed with the point cloud, for example, provided as an additional feature vector to classifier(s) in addition to the point cloud data. The data may be collected by dedicated sensors and/or by querying sub-systems in the vehicle. Exemplary additional data includes: indications of the state of the doors by door sensors (e.g., locked, unlocked but closed, ajar), and an accelerometer.

Figure 7:
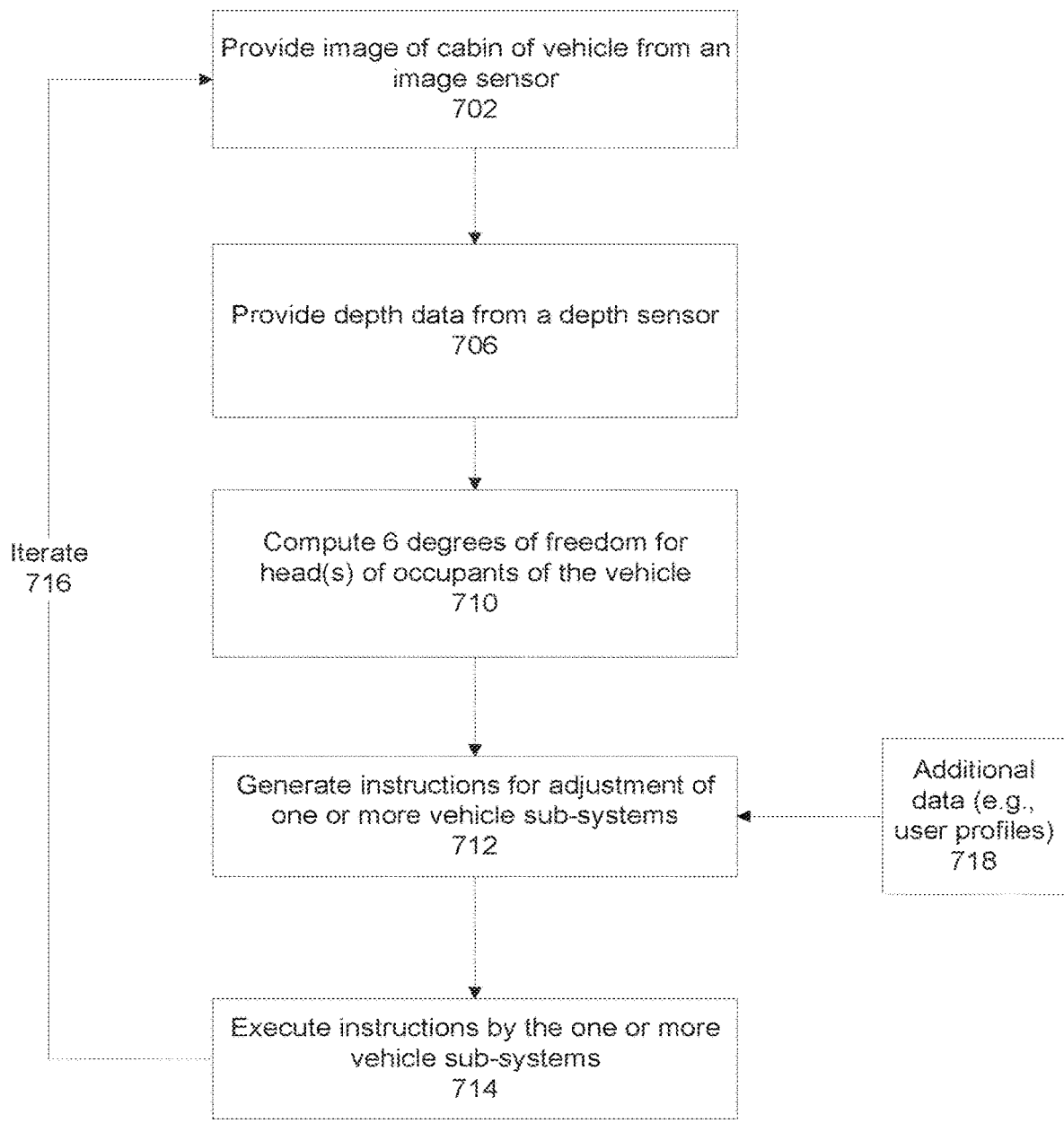
FIG. 7 is a flowchart of a method of adjustment of one or more vehicle sub-systems according to an analysis of a computed 6 DOF of one or more vehicle occupants, in accordance with some embodiments of the present invention.

Reference is now made to FIG. 7, which is a flowchart of a method of adjustment of one or more vehicle sub-systems according to an analysis of a computed 6 DOF of one or more vehicle occupants, in accordance with some embodiments of the present invention. The process described with reference to FIG. 7 may be implemented by components of system 100 described with reference to FIG. 1. The method described with reference to FIG. 7 may be executed simultaneously with one or more of the method described with reference to FIGS. 3-5 and 9-10, and/or after execution of the method described with reference to FIGS. 3-5 and 9-10.

At 702, one or more images of a cabin of a vehicle captured by an image sensor (e.g., 154 of FIG. 1) are obtained. Optionally, the image(s) is a near infra-red (NIR) image and/or a visible light image. The image may be a single image, or a sequence of images, such as a video, from which a single image (e.g., frame) may be extracted.

Optionally, the image sensor captures an image of the cabin of the vehicle where the occupants are sitting. The FOV of the image sensor is set to be wide enough to capture occupants of the vehicle sitting at any of the available seating positions in the cabin, for example, via fisheye optics. Optionally the image sensor captures a wide FOV image of all the occupants of the vehicle, including one or more of the driver, passenger sitting beside the driver, and/or one or more (optionally all) of the passengers sitting in row(s) behind the driver. Optionally, all occupants of the vehicle are captured simultaneously in the same image (e.g., single image) captured by the image sensor.

At 706, depth data is obtained according to output of a depth sensor (e.g., 152 of FIG. 1) that senses the cabin of the vehicle.

Optionally, an indication of depth of each head of each occupant is computed from the depth data.

The depth sensor may be implemented as the point cloud sensor, where the depth data is implemented as the point cloud outputted by the point cloud sensor. Alternatively or additionally, the depth sensor is implemented for example, based on ultrasound.

The depth may be computed according to the computed point cloud, for example, as described herein.

The computed depth may be according to the reference location and/or reference axis.

The 2D location and the depth denote the 3D position of the head. The 3D position of the head may be represented as coordinates in a three dimensional space. The coordinates of the 3D space may be defined according to a fixed location within the vehicle.

The head position is computed for each occupant of the vehicle.

At 710, 6 DOF are computed for head(s) of occupants of the vehicle.

The image is analyzed to detect a two dimensional (2D) location of a head of occupant(s), optionally the head of each of the occupants. Alternatively, some heads are detected and other heads are ignored, for example, based on user preference which may be obtained via manual user input using a graphical user interface, and/or based on stored user profiles and/or based on a predefined set of rules for selection of occupants to detect.

As used herein, the term each head of each occupant refers at least to the occupants that are being analyzed. Occupants being ignored may be excluded from further processing, or may be analyzed and later discarded (e.g., instructions are not generated for such occupants).

Optionally, the image is analyzed to detect each face of each occupant. The analysis may be performed, for example, by code designed to segment faces, based on an analysis of the point cloud to detect contours indicative of faces, a face recognition process, and/or a trained deep neural network.

As used herein, the term head may sometimes be interchanged with the term face, for example, the 2D location may be of the head or face or other reference on the head of the occupant, according to the selected implementation.

The 2D location may be according to a reference location on the head and/or face, for example, the nose, right eye, left eye, chin, right ear, or left ear. Alternatively or additionally, the 2D location may be according to a reference axis (or axes), which may be used to determine angles, for example, a straight line between the left and right eye, a triangle drawn between both eyes and the nose, and/or a straight line from the nose to the center of the mouth.

Optionally, three angular degrees of freedom of each head of each occupant are computed according to the image and/or according to the depth data. The angular degrees of freedom may be computed according to the point cloud.

Optionally, the three angular degrees of freedom are computed by inputting the image(s) and/or the depth data into a trained classifier. The trained classifier may be trained using a training dataset of images and/or depth data, and associated tag (e.g., metadata) of a ground truth of three angular degrees of freedom.

Exemplary architectural implementation of the classifier includes one or more of (e.g., arranged as cascade classifiers, parallel classifiers, and/or a combined architecture): one or more neural networks which may include an individual neural network and/or an architecture of multiple neural networks (e.g., convolutional neural network (CNN), fully connected neural network), deep learning based methods, support vector machine (SVM), sets of rules, logistic regression, k-nearest neighbor, and decision trees.

A data structure storing the computed 6 DOF may be created and/or defined. The computed 6 DOF may be stored for each occupant of the vehicle. It is noted that the data structure may already exist in the form of the stored 6 DOF which may be created and/or stored upon computation thereof based on outputs of the sensor(s).

Optionally, the 6 DOF are computed for each occupant of the vehicle, for example, including a driver, a passenger sitting beside the driver and one or more passengers sitting in a back seat of the vehicle.

Optionally, the 6 DOF is computed for each vehicle occupants according to a same image and a same output of the depth sensor, for example, according to a same point cloud computed for the cabin of the vehicle.

The FOV of the image sensor and/or depth sensor, optionally of the point cloud sensor, is set to be wide enough to capture occupants of the vehicle, optionally all occupants of the vehicle, sitting at any of the available seating positions in the cabin. The FOV may be, for example, about a full hemisphere (e.g., 180 degrees) or about 170 degrees, or about 145 degrees, or about 120 degrees, or other values.

Optionally, all occupants of the vehicle are captured simultaneously in the same point cloud captured by the point cloud sensor.

Optionally, a 6 DOF computed relative to a sensor frame of reference (i.e., of the point cloud sensor, the image sensor, and/or the depth sensor) is translated to an external reference which is external to the image sensor and/or the depth sensor. For example, the external reference may be according to the 3D space and/or coordinate system defined relative to fixed locations of the vehicle. Optionally, the translating is performed by a rotation, which rotates the vector connecting the head to the image sensor and/or depth sensor to a predefined direction in the external frame of reference. This rotation when applied to the 6 DOF given in the image sensor and/or the depth sensor frame of reference coordinate system, will result in the 6DOF given in the external frame of reference coordinate system.

At 712, instructions for adjustment of one or more vehicle sub-system are generated according to the computed 6 DOF of each vehicle occupant. The instructions may be generated, for example, according to a set of rules, based on a template and/or defined instructions mapped to 6 DOF, and/or according to a trained machine learning process that outputs instructions in response to inputted 6 DOF. The instructions may be for execution by the one or more vehicle sub-systems for adjustment of, for example, ECUs and/or components, such as electrical and/or mechanical components, that are controlled by the respective sub-system.

The instructions may be, for example, a script, binary code, values for parameters of the sub-systems, and/or based on other formats.

The instructions may be generated independently for each vehicle occupant according to the 6 DOF computed for each respective vehicle occupant. Alternatively or additionally, the instructions are generated based on an aggregation of the 6 DOFs of multiple vehicle occupants. For example, when computing instructions for sound transmission in the cabin, where the driver is talking on the phone and a back seat passenger is listening to music, the locations of both occupants may be considered in computation of the instructions.

Some exemplary instructions for exemplary sub-systems are described below with reference to FIG. 8.

At 714, the instructions are executed by the one or more vehicle sub-systems. The computing device may transmit the generated instructions over the vehicle network (e.g., 112B, CAN-bus) to the target sub-systems (e.g., 112A, ECUs).

At 716, one or more features described with reference to steps 702-714 and/or 718 are iterated. Iterations may be performed, for example, at defined time intervals (e.g., once every about half second, or second, or two seconds, or other values), and/or triggered by events (e.g., detection of movement of the head of the occupant).

Optionally, the 6 DOF are iteratively computed as described herein, and/or the instructions for adjustment of the vehicle sub-system(s) are dynamically computed according to the iterations of the computation of the 6 DOF. For example, the headlights are dynamically adjusted according to the movement of the user's head.

Optionally, an average 6 DOF are computed over multiple iterations over a recent historical time interval, optionally by a temporal sliding window that may slide according to the iteration rate, for example, for the last 6 seconds where the 6 DOF were computed every second, for the last 5 seconds where the 6 DOF were computed every half second, or for the last 10 seconds where the 6 DOF were computed every two seconds, or other values. A sequence of 6 DOFs may be smoothed according to the average 6 DOF values. In another example, smoothing of the 6 DOF is performed by an IIR digital filter which may be mathematically denoted as:

$$AV_n = (1-\alpha) \cdot AV_{n-1} + \alpha \cdot DOF$$

where:
AV denotes the average value,
DOF denotes the computed estimated head position and/or head angle (i.e., 6 DOF), and
$\alpha$ denotes a small number controlling the level of smoothness.

The instructions for adjustment of the vehicle sub-system are computed according to the average 6 DOF. The average 6 DOF may smooth out irrelevant fluctuations of small movements of the head of the operator. For example, small shifts in the movement of the head for which the dynamically adapting the vehicle sub-system is irrelevant. Since the head may move and/or rotate rather quickly, instructions for adapting certain sub-systems may be computed according to the average 6 DOF of the occupant(s). For example, position of air vents may be adjusted (e.g., as described with reference to act 802 of FIG. 8) according to the average 6 DOF of the respective head(s) of the occupant(s) rather than adjusting to small head movements and/or rotations.

Optionally, a likelihood of an impending 6 DOF is predicted according to the iterative computations over a historical time interval. The prediction may be performed, for example, by a regression analysis of the historical 6 DOF, and/or extrapolation into the future. In another example, the prediction may be performed by a trained classifier trained based on historical 6 DOFs of the current occupants (e.g., dynamically trained) and/or other occupants of other cars (e.g., centrally trained). The instructions are generated according to the predicted impending 6 DOF.

At 718, additional data may be provided, for example, user profiles, as described herein. The instructions for execution by the vehicle sub-systems are generated based on the additional data, for example, the music set according to user preference defined by the user profile and/or according to the 6 DOF of the occupant.

Figure 8:
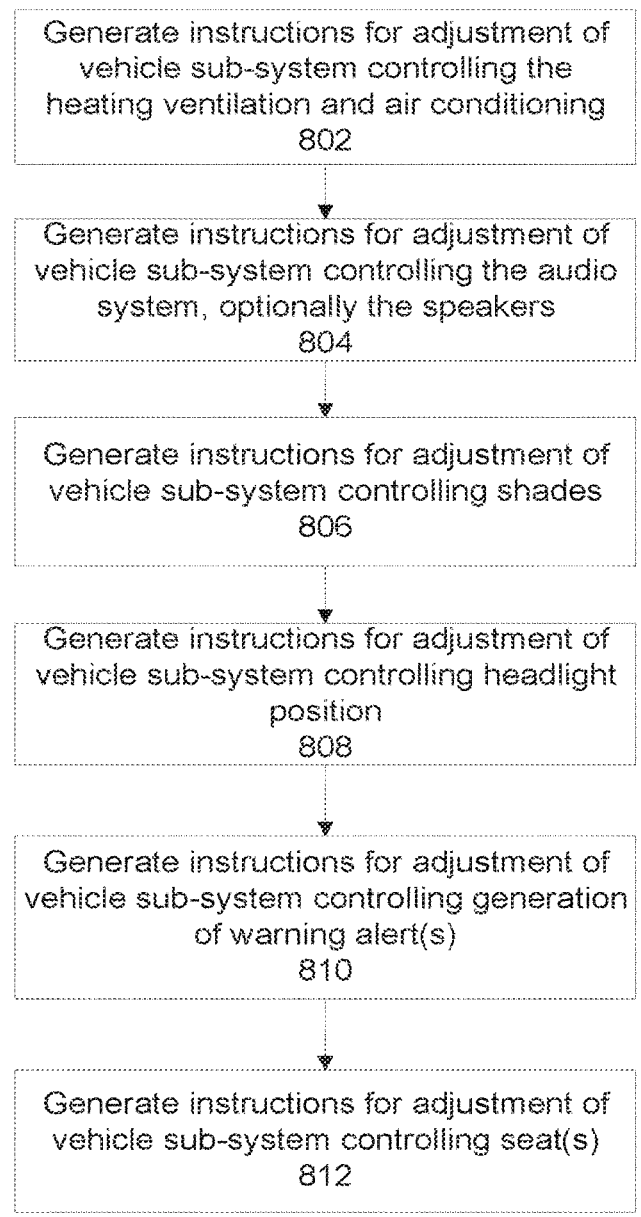
FIG. 8 is a flowchart of a process for generating exemplary instructions for adjustment of one or more exemplary sub-systems, in accordance with some embodiments of the present invention.

Reference is now made to FIG. 8, which is a flowchart of a process for generating exemplary instructions for adjustment of one or more exemplary sub-systems, in accordance with some embodiments of the present invention. It is noted that one or more of acts 802-812 may be executed, in any order, and/or in parallel and/or according to a combination. Some acts may be executed while other acts may be ignored. Alternatively, all acts are executed.

Optionally, at 802, the generated instructions are for adjusting the sub-system controlling a heat ventilation and air conditioning (HVAC) system, optionally the direction and/or intensity of air vents of the HVAC system, for example, employing an electrically controlled air flow. The adjustment is performed for directing airflow outputted by the air vents of the HVAC towards respective heads of each vehicle occupant, according to the computed respective 6 DOF. Optionally, the adjustment is performed for directing airflow towards a target region of the head of the user, for example, to the face of the user, to the back of the head of the user, center of the face of the user. The target region may be defined, for example, as a preset configuration, selectable by a user (e.g., via a graphical user interface), and/or defined by a user profile of the respective occupant. For example, the nearest air vent beside each occupant is directed towards the head of the nearest occupant, according to the computed 6 DOF of the head of the nearest occupant.

Optionally, each air vent is independently adjusted, for example, according to the nearest occupant. Alternatively, multiple air vents are adjusted according to multiple occupants, to create a synergistic air flow effect for multiple occupants by multiple air vents.

Optionally, the instructions are for adjustment of direction (e.g., pitch and/or yaw) of the airflow vents located at different positions in the cabin of the vehicle. The pitch and/or yaw are adjusted for directing airflow outputted by the airflow vents towards respective heads of each of the vehicle occupants. For example, the head position is denoted by coordinates according to a reference frame of the vehicle, mathematically represented as (x_h, y_h, z_h), where:
x denotes the longitudinal direction along the vehicle (e.g., front to back),
y denotes the lateral direction across the vehicle (e.g., left to right), and
z denotes the height reaction (e.g., bottom to top).

The position of each air vent is denoted as (x_v1, y_v1, z_v1), where v1 denotes air vent 1, and similarly for other air vents denoted v2, v3, etc.

The pitch and/or yaw angles of the air vents are set for directing airflow towards the head of the respective occupant may be mathematically represented as:

$$\theta_{pitch} = \arctan\left(\frac{z_h - z_{v1}}{x_h - x_{v1}}\right)$$

$$\theta_{yaw} = \arctan\left(\frac{y_h - y_{v1}}{x_h - x_{v1}}\right)$$

The distance between the respective air vent and the head of the respective occupant may be computed according to the following relationship:

$$d = \sqrt{(x_h - x_{v1})^2 (y_h - y_{v1})^2 + (z_h - z_{v1})^2}$$

Optionally, the instructions for adjustment of intensity of airflow by the airflow vents located at different positions in the cabin of the vehicle are computed according to respective distances from each of the airflow vents to respective heads of each of the vehicle occupants. The instructions for adjustment of intensity by a certain airflow vent may be according to a distance between a certain head and the certain airflow vent. The larger the distance, the stronger the airflow intensity, and/or the smaller the distance, the lower the airflow intensity.

The airflow intensity and/or rate may be computed for each vent based on a combination of distance to the respective airflow vents and/or the 6 DOF of a certain occupant and/or each occupant. For example, intensity of airflow of a vent facing the driver's face (or another occupant's face) is increased, and/or intensity of airflow of other vents not in front of the driver's face is decreased.

Optionally, each air vent is independently adjusted, for example, according to the nearest occupant. Alternatively, multiple air vents are adjusted according to multiple occupants, to create a synergistic air flow effect for multiple occupants by multiple air vents.

Alternatively or additionally, at 804, the instructions are generated for adjusting the sub-system controlling the audio system, optionally the speakers. Optionally, the adjustment is performed according to target audio parameters, for example, a preset configuration, selectable by a user (e.g., via a graphical user interface), and/or defined by a user profile of the respective occupant. The target audio parameters may represent an optimal sound experience, according to user definition and/or according to a preset definition.

Each speaker may be adjusted independently, or multiple speakers may be adjusted together to achieve a target synergistic effect arising from the multiple speakers.

Optionally, the instructions are for adjusting a ratio between amplitudes of speakers located at different locations in the cabin of the vehicle, and/or for adjusting the respective volume of each speaker. The speakers are adjusted according to the 6 DOF of the vehicle occupant(s), optionally according to all present vehicle occupants.

Alternatively or additionally, the instructions are for adjusting the volume of the speakers according to the 6 DOF of the vehicle occupant(s) relative to the location of the speakers, for example, according to the distance from the head (optionally from each ear) of the respective occupant to one or more of the speakers. The volume is adjusted for maintaining a sound balance between two ears of the vehicle occupant(s) (e.g., between the two ears of each of the multiple occupants of the vehicles). Speakers may be adjusted to have stronger gain to compensate a decrease in sound level. The perceived sound (by the respective occupant) from each speaker may decrease as $1/d^2$ where d denotes the speaker to ear distance. By increasing the gain accordingly, a balanced sound experience can be maintained.

Alternatively or additionally, the instructions are for adjusting the speakers to overcome internal sound reflection and/or path issues by position dependent equalizer. A spectral map of sound propagation by the multiple speakers located in the cabin of the vehicle may be pre-computed for different possible head positions and/or head angles of the vehicle occupant(s) (e.g., all possible head positions and/or head angles for all vehicle occupants and/or all possible combinations of sitting arrangements of occupants). The spectral map may be pre-calculated by mapping the basic acoustic structure of the cabin of the vehicle. The pre-calculated spectral map may be stored in a memory and/or other data storage device, and accessed for generation of the instructions. The instructions for adjusting the speakers are computed according to the spectral map for overcoming internal sound reflection and/or according to path propagation. The spectral map may be used to optimize the equalizer in different ways for different head positions. For example, when the driver's head is closer to the car frame, the bass level, which tends to propagate stronger through solid objects, may be tuned down to prevent strong reflection from the car's body.

Alternatively or additionally, the instructions are for adjusting speakers for suppressive destructive interference effects and/or enhancing constructive interference effects. For example, this may allow the driver to have a phone call with minimized interferences while having the passenger listen to music simultaneously, using the same set of car speakers. Optionally, the instructions are for adjusting a relative phase between the multiple speakers for generating a localized target destructive interference effect and/or generating a localized target constructive interference effect. The localized target effects may be defined for each of multiple vehicle occupants according to the 6 DOF of each vehicle occupant. For example, for simplicity of explanation, a two-speaker system is discussed but the concepts may be extended to a larger number of speakers such as in a surround sound system. The transmitted phase may be adjusted and/or selected such that upon arrival of the sound waves to the occupant's head (e.g., ear), the phase from the two speakers will have opposite signs. The opposite signs create a destructive interference which will greatly reduce the sound level at the occupant's position. The instructions for adjustment of the speakers may be independently computed for each frequency produced by each of the speakers and/or according to relative distances from each head of each vehicle occupant to each respective speaker. The target phase difference between two speakers may be mathematically denoted as:

$$\varphi_{1\to 2} = \frac{f}{v}(d1 - d2) - \pi$$

Where:
v denotes the speed of sound,
d1 denotes the distance from the occupant's head (e.g., one ear or both ears) to the first speaker,
d2 denotes the distance from the occupant's head (e.g., both ears, or the same one ear or the other ear) to the second speaker,
f denotes the frequency.

The target phase difference may be computed independently for each frequency in order to create the overall desired target effect.

Alternatively or additionally, at 806, the instructions are generated for adjusting sub-system(s) that control shades of the vehicle for blocking sun. The instructions are generated according to the 6 DOF of the vehicle occupant(s) and/or according to a computed position of the sun. Shades may be adjusted for each occupant according to the nearest window of the occupant, and/or according to the window where the respective occupant is facing.

The position of the sun may be computed according to the geographic position of the vehicle, compass azimuth, and/or time. The geographic position of the vehicle may be represented, for example, by longitude and/or latitude. The geographic position of the vehicle may be computed, for example, based on a global positioning system (GPS) system installed on the car, and/or based on triangulation of a location of a phone located in the car.

The instructions for adjusting the shades of the vehicle may be computed according to a target shadow line located below an eye level of the occupant(s), for example, the driver and/or passengers. The target shadow line may be computed according to the sun angle(s), and/or 6 DOF of the respective occupant.

Alternatively or additionally, at 808, the instructions are generated for dynamic adjustment of a sub-system controlling positions and/or orientation of headlights of the vehicle. The pitch and/or yaw of each of the headlights may be adjusted. The instructions are generated according to 6 DOF of the driver. The direction of the headlights may be dynamically and/or rapidly adjusted according to a tracking of the 6 DOF of the driver. The rapid and/or dynamic adaption in real time based on the driver may increase headlight efficiency in the direction of driver attention and/or reduce unnecessary illumination in other directions.

Alternatively or additionally, at 810, instructions are generated for generating a warning alert. The warning alert may be implemented as, for example, an icon presented on a display, a message presented on a display, a light on a dashboard, and/or an audio message played over speakers. The warning alert may be generated when an obstacle located externally to the vehicle is detected. An indication of the object located externally to the vehicle may be obtained, for example, from another vehicle sub-system that detects the obstacle. The threshold triggering the alert may be according to the attention by the driver to the obstacle. The alert may be generated when the 6 DOF of the driver are indicative that the driver is not looking at the obstacle.

Optionally, the alert is not generated when the 6 DOF of the driver are indicative that the driver is looking at the obstacle. In such cases, since the driver is already looking at the obstacle, generating an alert may be redundant, and/or may result in driver annoyance, distraction, and/or confusion.

Optionally, a preventive reaction by the driver in response to the obstacle is monitored. The monitoring may be based on the head 6 DOF of the driver indicating that the driver is looking at the obstacle. The alert is generated when the time threshold has passed and the preventive reaction by the driver has not been detected. Postponing the alert allows the drivers to react on their own. Such postponement may reduce unnecessary alarms, while maintaining a high level of safety.

Alternatively, when the driver is not looking at the obstacle, the alert may be generated after a predefined time threshold selected to allow the driver time to look at the obstacle on his/her own. If time threshold passes without the driver looking at the obstacle, the alert may be generated. The threshold may be a predefined value, and/or dynamically computed, for example, based on the speed of the car and the distance to the obstacle.

Optionally, in the case of autonomous vehicles, the alert may be generated for cases in which the automatically driven car requires instructions or assistance from the human driver. When the 6 DOF is indicative that the human driver attention is focused somewhere else than the road in front, instructions generated for execution by the sub-system(s) of the automatically driven car may first give an indication that attention is needed. After a predefined time threshold waiting period has elapsed, the human driver may be engaged. Such process allows the human driver to focus attention first, before immediate action is needed. If, on the other hand, the driver's 6 DOF is indicative that the attention of the driver is maintained off the road, immediate action may be requested by the sub-system of the automatic vehicle.

Alternatively or additionally, at 812, the instructions are generated for dynamic adjustment of the sub-system that controls a seat of a respective occupant. Optionally, the seat of each occupant may be independently adjusted. The instructions are generated according to the 6 DOF of the respective vehicle occupant.

Optionally, the seat adjustment is performed according to target seat parameters, for example, a preset configuration, selectable by a user (e.g., via a graphical user interface), and/or defined by a user profile of the respective occupant.

Exemplary seat adjustment parameters include: seat height, seat forward-backward position, seat back tilt angle, and headrest height.

Optionally, the seat is dynamically adjusted according to mapping (e.g., a set of rules) between 6 DOF and seat position. The mapping may be selected for providing optional position of the head of the respective occupant (e.g., driver, passenger(s)) for best view of a road ahead and/or best view of surroundings and/or for comfort). The best view may be selected while maintaining a target comfort level.

Figure 9:
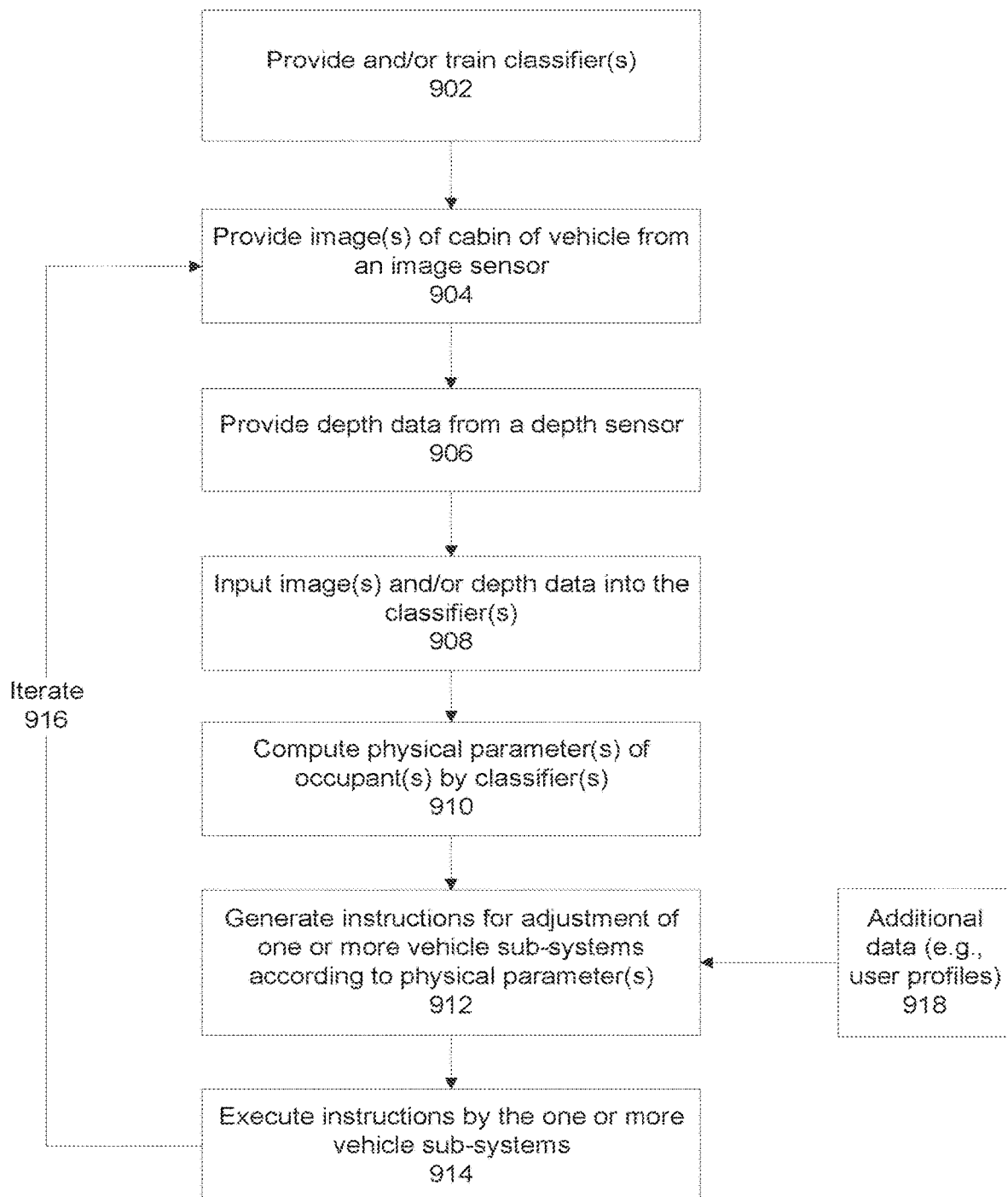
FIG. 9 is a flowchart of a method of adjustment of vehicle sub-system(s) according to an analysis of physical parameters vehicle occupants computed based on image(s) and/or depth data, in accordance with some embodiments of the present invention.

Reference is now made to FIG. 9, which is a flowchart of a method of adjustment of vehicle sub-system(s) according to an analysis of physical parameters of vehicle occupants computed based on image(s) and/or depth data, in accordance with some embodiments of the present invention. The process described with reference to FIG. 9 may be implemented by components of system 100 described with reference to FIG. 1. The method described with reference to FIG. 9 may be executed simultaneously with one or more of the methods described with reference to FIGS. 3-5 and 7-8 and/or after execution of the method described with reference to FIGS. 3-5 and 7-8.

At 902, a classifier is trained and/or provided. The classifier outputs an indication of one or more physical parameters for each occupant in response to image(s) and/or depth data depicting the occupant(s). The classifier is trained according to a training dataset storing training images and/or training depth data of each of sample individuals, and an associated indication (e.g., label, tag, metadata, linked data) of one or more physical parameter for each of the sample individuals. The physical parameters for each sample individual may be obtained, for example, by performing manual measurements and/or based on data disclosed by the sample individuals, for example, weighting the sample individuals, and measuring the height of the sample individuals.

The classifier may be implemented, for example, a deep neural network (DNN), one or more neural networks of various architectures (e.g., artificial, convolutional, fully connected), support vector machine (SVM), logistic regression, k-nearest neighbor, and decision trees.

In another implementation, the classifier is trained and implemented as instruction code that when executed by a processor(s), performs the following:
  (i) Analyzing the depth data to estimate volume and/or dimensions (e.g., including height) of each occupant. The body structure of each occupant is computed according to the computed estimate of volume and/or dimensions, for example, using a lookup table that maps volume and/or dimension to body structure. Mass of each occupant is computed according to the computed body structure, for example, according to average estimated density and/or using a lookup table that maps body structure to mass.
  (ii) Age and/or gender may be computed according to the computed body structure. For example, by a lookup table that maps body structure to age and/or gender.
  (iii) Relative locations of one or more body parts (e.g., hand, leg, torso, head) may be computed according to the depth data. A body posture classification category may be computed according to the identified relative locations of the body part(s).

At 904, one or more images of a cabin of a vehicle captured by an image sensor (e.g., 154 of FIG. 1) are obtained. The images(s) depict one or more occupants of the vehicle.

Optionally, the image(s) is a near infrared (NIR) image and/or a visible light image. The image may be a single image, or a sequence of images such as a video, from which a single image (e.g., frame) may be extracted.

Optionally, the image sensor captures an image of the cabin of the vehicle where the occupants are sitting. The FOV of the image sensor is set to be wide enough to capture occupants of the vehicle sitting at any of the available seating positions in the cabin, for example, via fisheye optics. Optionally the image sensor captures a wide FOV image of all the occupants of the vehicle, including one or more of the driver, passenger sitting beside the driver, and/or one or more (optionally all) of the passengers sitting in row(s) behind the driver. Optionally, all occupants of the vehicle are captured simultaneously in the same image (e.g., single image) captured by the image sensor.

Alternatively or additionally to act 904, at 906, depth data is obtained according to output of a depth sensor (e.g., 152 of FIG. 1) that senses the cabin of the vehicle. The depth data depict one or more occupants of the vehicle.

The depth sensor may be implemented as the point cloud sensor, where the depth data is implemented as the point cloud outputted by the point cloud sensor. Alternatively or additionally, the depth sensor is implemented, for example, based on ultrasound.

The depth may be computed according to the computed point cloud, for example, as described herein.

At 908, the image(s) and/or depth data are inputted into the classifier(s).

At 910, the classifier(s) computes an indication of one or more physical parameters for the occupants, optionally for each occupant.

The physical parameters denote physical measurements of the occupants. The physical parameters may be estimated, for example, as an absolute value optionally associated with an error range, and/or a category of a range of values from multiple possible categories.

Exemplary physical parameters of absolute values include: mass, height, age, gender, body pose, and gender. Exemplary physical parameters of classification categories include: mass classification category (e.g., <10 kg, 11-25 kg, 25-70 kg, 70-100 kg, >100 kg), height classification category (e.g., <50 cm, 50-100 cm, 101-140 cm, 140-180 cm, >180 cm), age classification category (e.g., <1 year old, 1-6, 6-12, 12-18, 18-60 60-80, >80, or baby, child, adult), and body pose classification category (e.g., straight, leaning forward, bending down, sitting upright, leaning to the left, facing backwards, and laying on a seat).

At 912, instructions for adjustment of one or more vehicle sub-systems are generated according to the computed physical parameters of the vehicle occupants. The instructions may be generated, for example, according to a set of rules, based on a template and/or defined instructions mapped to physical parameters, and/or according to a trained machine learning process that outputs instructions in response to inputted physical parameters.

The instructions may be for execution by the one or more vehicle sub-systems for adjustment of, for example, ECUs and/or components, such as electrical and/or mechanical components, that are controlled by the respective sub-system.

The instructions may be, for example, a script, binary code, values for parameters of the sub-systems, and/or based on other formats.

The instructions may be generated independently for each vehicle occupant according to the physical parameters computed for each respective vehicle occupant. Alternatively or additionally, the instructions are generated based on an aggregation of the physical parameters of multiple vehicle occupants. For example, when computing instructions for performing an emergency maneuver, the center of mass of the vehicle is computed according to an analysis of the masses and locations of all occupants.

Some exemplary instructions for exemplary sub-systems are described below with reference to FIG. 10.

At 914, the instructions are executed by the one or more vehicle sub-systems. The computing device may transmit the generated instructions over the vehicle network (e.g., 112B, CAN-bus) to the target sub-systems (e.g., 112A, ECUs).

At 916, one or more features described with reference to act 904-914 and/or 918 are iterated. Iterations may be performed, for example, at defined time intervals (e.g., once every about half second, or second, or two seconds, or other values), and/or triggered by events (e.g., detection of movement of the occupant). It is noted that some physical parameters are expected to remain constant, and once computed do not necessarily need to be re-computed, for example, mass and height. Other physical parameters are dynamic, and may be re-computed by the iterations described herein, for example, the body posture of the occupant.

At 918, additional data may be provided, for example, user profiles, as described herein. The instructions for execution by the vehicle sub-systems are generated based on the additional data, for example, the air bag is set according to a predefined configuration for a certain mass classification category.

Figure 10:
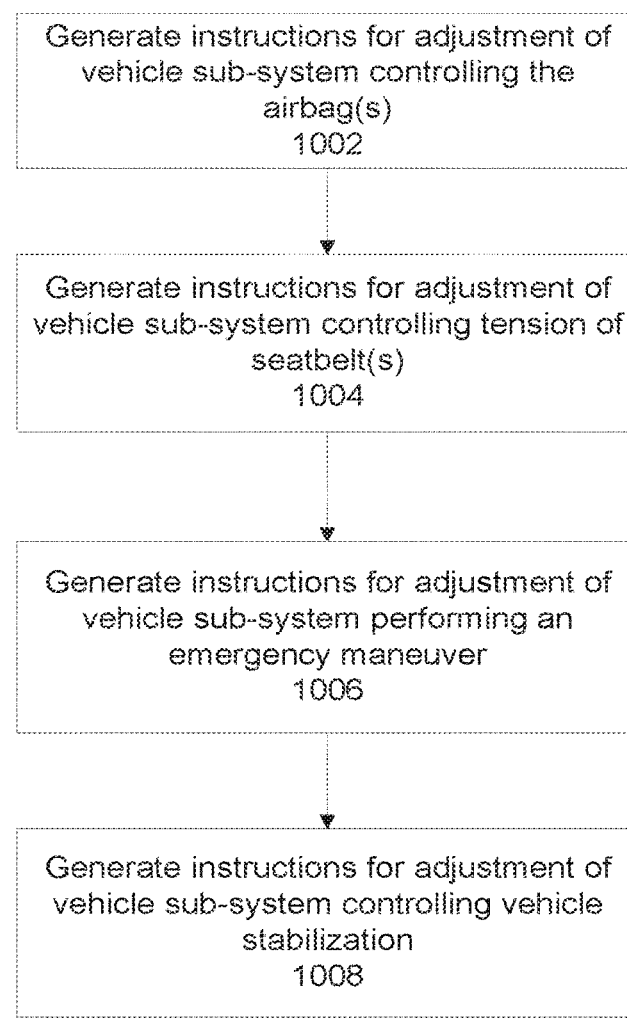
FIG. 10 is a flowchart of a process for generating exemplary instructions for adjustment of one or more exemplary sub-systems based on computed physical parameters(s) of vehicle occupants, in accordance with some embodiments of the present invention.

Reference is now made to FIG. 10, which is a flowchart of a process for generating exemplary instructions for adjustment of one or more exemplary sub-systems based on computed physical parameters(s) of vehicle occupants, in accordance with some embodiments of the present invention. It is noted that one or more of acts 1002-1008 may be executed, in any order, and/or in parallel and/or according to a combination. Some acts may be executed while other acts may be ignored. Alternatively, all acts are executed.

Additional exemplary details of generating instructions for adjustment of vehicle parameters are described with reference to act 610 of FIG. 6.

Optionally, at 1002, the generated instructions are for adjusting parameters of an airbag vehicle sub-system. Airbag parameters may be independently adjusted for each respective occupant according to the physical parameters of the respective occupant.

Examples of adjustable airbag parameters and how the parameters are adjusted according to the physical parameters of the occupants include:
  Airbag pressure set to support height and/or mass and/or age of the respective occupant. For example, higher pressures for larger heights and/or heavier masses, and relatively lower pressures for kids (e.g., age <5 or a child age category).
  Activation trigger set according to body pose of the respective occupant. For example, disabling activation of a side airbag when a passenger is leaning on the side of the vehicle at the location of the airbag.
  Relative pressure and relative activating sequence for each of multiple airbags of a single occupant, for example, according to the position and/or mass of the occupant. For example, disabling activation of a side airbag when a passenger is leaning on the side of the vehicle at the location of the airbag, and activating another airbag from another direction where the passenger is not leaning.
  Disabling of at least one airbag for an age indicative of small children and/or indication of body pose likely to incur damage from deployment, for example, turn off airbag for children in backward facing seats. Airbags may be disabled when the risk of harm is computed as being greater than the safety benefit.
  Direction of airbag during deployment for likelihood of increasing protection of the body of the respective occupant, for example, according to body position and/or height. For example, tilting the airbag higher for taller occupants, tilting the airbag downwards for shorter occupants, and timing of the deployment of the airbag to provide optimal contact at passenger location at the vehicle estimated time of impact.

Alternatively or additionally, at 1004, the generated instructions are for adjusting tension of a seatbelt sub-system of each respective occupant according to the physical parameters (e.g., height and/or mass) of the respective occupant, for example, relatively higher tension for relatively larger masses. The seatbelt tension may be adjusted in response to pre-crash and/or hazardous scenarios which may be detected by other vehicle components. The tension may be selected to provide sufficient force to hold the respective passenger in place while reducing risk of injury due to over-tension. The seat belt tension may be selected to optimize comfort of the occupants while minimizing free motion of occupants in critical scenarios. [left off proofreading]

Alternatively or additionally, at 1006, the generated instructions are for controlling a vehicle emergency maneuver sub-system for performing an emergency maneuver for minimizing damage to each occupant. The vehicle emergency maneuver sub-system may be activated in response to a hazardous situation detected by other vehicle components, for performing an automatic emergency maneuver. For example, the vehicle may automatically turn sharply to avoid an impact with an oncoming vehicle or obstacle.

Examples of emergency maneuvers and how the emergency maneuvers are adjusted according to the physical parameters of the occupants include:

A turn to reduce or avoid impact. The turn may be computed according to mass and/or body pose of the occupants, optionally according to all occupants.

Maneuvering the vehicle for reducing severity of impact on seats occupied by children.

Maneuvering the vehicle for impact at unoccupied locations.

Alternatively or additionally, at 1008, the generated instructions are for adjustment of a vehicle stabilization sub-system according to a center of mass of the vehicle and/or current body pose of the occupants. The center of mass is computed according to an aggregation of mass and location of each occupant.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant vehicle sub-systems and vehicle networks will be developed and the scope of the terms vehicle sub-systems and vehicle networks are is intended to include all such new technologies a priori.

As used herein the term about refers to ±10%.

The terms comprises, comprising, includes, including, having and their conjugates mean including but not limited to. This term encompasses the terms consisting of and consisting essentially of.

The phrase "consisting essentially of" means that the composition or method may include additional ingredients and/or steps, but only if the additional ingredients and/or steps do not materially alter the basic and novel characteristics of the claimed composition or method.

As used herein, the singular form "a," "an" and "the" include plural references unless the context clearly dictates otherwise. For example, the term a compound or at least one compound may include a plurality of compounds, including mixtures thereof.

The word "exemplary" is used herein to mean "serving as an example, instance or illustration." Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments." Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A system for generating instructions for adjustment of at least one vehicle sub-system according to an analysis of parameters of at least one vehicle occupant, comprising:
   at least one hardware processor; and
   a non-transitory memory having stored thereon a code for execution by the at least one hardware processor, the code comprising instructions for:
   obtaining at least one of: (i) at least one image of a cabin of a vehicle captured by an image sensor, and (ii) depth data from a depth sensor that senses the cabin of the vehicle, wherein the at least one image and the depth data depict at least one occupant of the vehicle;
   inputting at least one of: (i) the at least one image and (ii) the depth data into at least one classifier;
   computing by the at least one classifier, an indication of at least one physical parameter of each of the at least one occupant, wherein the at least one classifier is trained according to a training dataset comprising a plurality of at least one of training images and training depth data of each of a plurality of sample individuals, and an associated indication of at least one physical parameter for each of the plurality of sample individuals; and
   generating instructions for adjustment of at least one vehicle sub-system according to the computed at least one physical parameter of the at least one vehicle occupant, wherein the generated instructions comprise at least one of instructions for adjusting tension of a seatbelt sub-system of each respective occupant and instructions for controlling the vehicle emergency maneuver sub-system for performing an emergency maneuver for minimizing damage to each occupant.

2. The system according to claim 1, wherein the at least one physical parameter of a respective occupant is an estimate of at least one member selected from the group consisting of: mass, mass classification category, height, height classification category, age, age classification category, gender, and body pose classification category.

3. The system according to claim 1, wherein the classifier comprises a deep neural network.

4. The system according to claim 1, wherein the classifier includes code for at least one of: (i) analyzing the depth data to estimate volume and dimensions including height of each of the at least one occupant, computing body structure of each of the at least one occupant according to the computed estimate of volume and dimensions, and computing mass of each of the at least one occupant according to the computed body structure; (ii) computing at least one of age and gender according to the computed body structure; and (iii) identifying relative locations of at least one body part according to the depth data and computing a body pose classification category according to the identified relative locations of at least one body part.

5. The system according to claim 1, wherein the generated instructions comprise instructions for adjusting parameters of an airbag vehicle sub-system for each respective occupant.

6. The system according to claim 5, wherein the parameters selected from the group consisting of: airbag pressure set to support at least one of height and mass of the respective occupant, activation trigger set according to body pose of the respective occupant, relative pressure and relative activating sequence for each of a plurality of airbags of a single occupant, disabling of at least one airbag for at least one of an age indicative of small children and indication of body pose likely to incur damage from deployment, and direction of airbag during deployment for likelihood of increasing protection of the body of the respective occupant.

7. The system according to claim 1, wherein the generated instructions comprise instructions for adjusting tension of a seatbelt sub-system of each respective occupant according to at least one of height and mass of the respective occupant, the tension selected to provide sufficient force to hold the respective occupant in place while reducing risk of injury due to over-tension.

8. The system according to claim 1, wherein the generated instructions comprise instructions for controlling the vehicle emergency maneuver sub-system for performing an emergency maneuver for minimizing damage to each occupant.

9. The system according to claim 8, wherein the emergency maneuver is selected from the group consisting of: a turn to reduce or avoid impact wherein the turn is computed according to at least one of mass and body pose of at least one occupant, reducing severity of impact on seats occupied by children, and maneuvering the vehicle for impact at unoccupied locations.

10. A system for generating instructions for adjustment of at least one vehicle sub-system according to an analysis of parameters of at least one vehicle occupant, comprising:
    at least one hardware processor; and
    a non-transitory memory having stored thereon a code for execution by the at least one hardware processor, the code comprising instructions for:
    obtaining at least one of: (i) at least one image of a cabin of a vehicle captured by an image sensor, and (ii) depth data from a depth sensor that senses the cabin of the vehicle, wherein the at least one image and the depth data depict at least one occupant of the vehicle;
    inputting at least one of: (i) the at least one image and (ii) the depth data into at least one classifier;
    computing by the at least one classifier, an indication of at least one physical parameter of each of the at least one occupant, wherein the at least one classifier is trained according to a training dataset comprising a plurality of at least one of training images and training depth data of each of a plurality of sample individuals, and an associated indication of at least one physical parameter for each of the plurality of sample individuals; and
    generating instructions for adjustment of at least one vehicle sub-system according to the computed at least one physical parameter of the at least one vehicle occupant, wherein the generated instructions comprise instructions for adjustment of a vehicle stabilization sub-system according to a center of mass of the vehicle computed according to an aggregation of mass and location of each occupant.

11. The system according to claim 10, wherein the at least one physical parameter of a respective occupant is an estimate of at least one member selected from the group consisting of: mass, mass classification category, height, height classification category, age, age classification category, gender, and body pose classification category.

12. The system according to claim 10, wherein the classifier comprises a deep neural network.

13. The system according to claim 10, wherein the classifier includes code for at least one of: (i) analyzing the depth data to estimate volume and dimensions including height of each of the at least one occupant, computing body structure of each of the at least one occupant according to the computed estimate of volume and dimensions, and computing mass of each of the at least one occupant according to the computed body structure; (ii) computing at least one of age and gender according to the computed body structure; and (iii) identifying relative locations of at least one body part according to the depth data and computing a body pose classification category according to the identified relative locations of at least one body part.

* * * * *